(12) United States Patent
Shair et al.

(10) Patent No.: US 12,509,430 B2
(45) Date of Patent: Dec. 30, 2025

(54) INHIBITORS OF NICOTINAMIDE N-METHYLTRANSFERASE, COMPOSITIONS AND USES THEREOF

(71) Applicant: President and Fellows of Harvard College, Cambridge, MA (US)

(72) Inventors: Matthew D. Shair, Lexington, MA (US); Daniel E. Jeffries, Lexington, MA (US); Hanna Tukachinsky, Lexington, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 574 days.

(21) Appl. No.: 17/799,508

(22) PCT Filed: Feb. 16, 2021

(86) PCT No.: PCT/US2021/018184
§ 371 (c)(1),
(2) Date: Aug. 12, 2022

(87) PCT Pub. No.: WO2021/163683
PCT Pub. Date: Aug. 19, 2021

(65) Prior Publication Data
US 2023/0159470 A1 May 25, 2023

Related U.S. Application Data

(60) Provisional application No. 63/109,595, filed on Nov. 4, 2020, provisional application No. 62/976,588, filed on Feb. 14, 2020.

(51) Int. Cl.
C07D 239/42 (2006.01)
A61K 45/06 (2006.01)
(Continued)

(52) U.S. Cl.
CPC .......... *C07D 239/42* (2013.01); *A61K 45/06* (2013.01); *A61P 35/04* (2018.01); *C07D 213/82* (2013.01)

(58) Field of Classification Search
CPC ........ C07D 239/42; A61P 35/04; A61K 45/06
(Continued)

(56) References Cited

U.S. PATENT DOCUMENTS 6,201,007 B1  3/2001  Ito et al.
8,785,183 B2  7/2014  Sjoberg
(Continued)

FOREIGN PATENT DOCUMENTS

CN  104744459 A   7/2015
CN  105062193 A  11/2015
(Continued)

OTHER PUBLICATIONS

4-Chloro-2-(methylamino)pyrimidine-5-carboxamide; ethane, PubChem, CID 144835720, Published Dec. 7, 2019 (Year: 2019).*
4-Methyl-2-(methylamino)pyrimidine-5-carboxamide, PubChem, CID 129930559, Published Oct. 6, 2017. (Year: 2017).*
Pyrimidine, 5-carbamoyl-2-methylamino-, PubChem, CID 69179728, Published Nov. 30, 2012 (Year: 2012).*
(Continued)

*Primary Examiner* — Jeffrey S Lundgren
*Assistant Examiner* — Heather Dahlin
(74) *Attorney, Agent, or Firm* — Foley Hoag LLP; Dana M. Gordon; Lawrence P. Tardibono

(57) ABSTRACT

Disclosed are compounds and pharmaceutically acceptable salts thereof, which are useful as inhibitors nicotinamide N-methyltransferase (NNIMT). Also disclosed are pharmaceutical compositions comprising a compound disclosed herein. Related methods of treating cancer in a subject and methods of inhibiting tumor growth in subject are also disclosed.

19 Claims, 10 Drawing Sheets

(51) Int. Cl.
  *A61P 35/04* (2006.01)
  *C07D 213/82* (2006.01)
(58) Field of Classification Search
  USPC .......................................................... 514/275
  See application file for complete search history.

(56) References Cited

U.S. PATENT DOCUMENTS

| | | |
|---|---|---|
| 11,078,197 B2 | 8/2021 | Glunz et al. |
| 2011/0224155 A1 | 9/2011 | Tachdjian et al. |
| 2012/0046243 A1 | 2/2012 | Maeda et al. |
| 2015/0361311 A1 | 12/2015 | Combs et al. |
| 2020/0108075 A1 | 4/2020 | Liang et al. |
| 2021/0147406 A1 | 5/2021 | Glunz et al. |
| 2023/0159470 A1 | 5/2023 | Shair et al. |

FOREIGN PATENT DOCUMENTS

| | | |
|---|---|---|
| EP | 2770998 A1 | 9/2014 |
| FR | 3014687 A1 | 6/2015 |
| FR | 3060316 A1 | 6/2018 |
| FR | 3060334 A1 | 6/2018 |
| FR | 3060338 A1 | 6/2018 |
| FR | 3060340 A1 | 6/2018 |
| HU | 221741 B1 | 12/2002 |
| JP | 2018199664 A | 12/2018 |
| WO | WO-2004003198 A1 | 1/2004 |
| WO | WO-2010068483 A2 | 6/2010 |
| WO | WO-2010/118041 A1 | 10/2010 |
| WO | WO-2011/031558 A2 | 3/2011 |
| WO | WO-2012154888 A1 | 11/2012 |
| WO | WO-2013041539 A1 | 3/2013 |
| WO | WO-2013113716 A1 | 8/2013 |
| WO | WO-2013135671 A1 | 9/2013 |
| WO | WO-2015000548 A1 | 1/2015 |
| WO | WO-2015191525 A1 | 12/2015 |
| WO | WO-2016176657 A1 | 11/2016 |
| WO | WO-2017028640 A1 | 2/2017 |
| WO | WO-2017080316 A1 | 5/2017 |
| WO | WO-2017080323 A1 | 5/2017 |
| WO | WO-2019122084 A1 | 6/2019 |
| WO | WO-2019144764 A1 | 8/2019 |
| WO | WO-2020086440 A1 | 4/2020 |
| WO | WO-2020123482 A1 | 6/2020 |
| WO | WO-2021/163683 A1 | 8/2021 |
| WO | WO-2023/129512 A1 | 7/2023 |
| WO | WO-2023/129513 A2 | 7/2023 |

OTHER PUBLICATIONS

Ruf S, et al. Novel nicotinamide analog as inhibitor of nicotinamide N-methyltransferase. Bioorg Med Chem Lett. Mar. 1, 2018;28(5):922-925. Epub Jan. 31, 2018. PMID: 29433927. (Year: 2018).*
Wang Y, Zeng J, Wu W, Xie S, Yu H, Li G, Zhu T, Li F, Lu J, Wang GY, Xie X. Nicotinamide N-methyltransferase enhances chemoresistance in breast cancer through SIRT1 protein stabilization. Breast Cancer Research. Dec. 2019;21:1-7. (Year: 2019).*
Ruf S, Hallur MS, Anchan NK, Swamy IN, Murugesan KR, Sarkar S, Narasimhulu LK, Putta VR, Shaik S, Chandrasekar DV, Mane VS. Novel nicotinamide analog as inhibitor of nicotinamide N-methyltransferase. Bioorganic & medicinal chemistry letters. Mar. 1, 2018;28(5):922-5. (Year: 2018).*
International Search Report and Written Opinion for International Application No. PCT/US2021/018184 mailed May 19, 2021.
Invitation to Pay Additional Fees for International Application No. PCT/US2021/018184 dated Mar. 22, 2021.
Katsoyannis et al., "Insulin Peptides. XI. The Synthesis of the B Chain of Human Insulin and Its Combination with the Natural A Chain of Bovine Insulin to Generate Insulin Activity," Journal of the American Chemical Society, 88(1):164-166 (1966).
Pubchem SID 230261391 create date Feb. 12, 2015: 8 pages (2015).
Pubchem, SID 240304617, Feb. 13, 2015 , https://pubchem.ncbi.nlm.nih.gov/substance/240304617.
Pubchem, SID 401201059, Dec. 7, 2019, https://pubchem.ncbi.nlm.nih.gov/substance/401201059.
Invitation to Pay Additional Fees for Application No. PCT/US22/53977 dated Mar. 14, 2023.
Invitation to Pay Additional Fees for International Application No. PCT/US22/53976, dated Mar. 17, 2023.
PubChem CID 69059899, create date Nov. 30, 2012, 7 pages.
International Search Report and Written Opinion for International Application No. PCT/US22/53977 dated Jun. 30, 2023.
International Search Report and Written Opinion for International Application No. PCT_US22_53976 dated May 16, 2023.
PubChem SID 368840395, Modify Date: May 25, 2018 (May 25, 2018), p. 2, figure.
Pubmed Compound Record for CID 12563095, 11 ,3]Dioxolo[4,5-b]pyridine-6-carboxamide', U.S. National Library of Medicine, Feb. 8, 2007 (Feb. 8, 2007).
Pubmed Compound Record for CID 69059899, '2,3-dihydro-1H-pyrido[2,3-b][1,4]oxazine-7-carboxamide', U.S. National Library of Medicine, Nov. 30, 2012 (Nov. 30, 2012).
Pubmed Compound Record for CID 69731907, '2,3-Dihydrofuro[2,3-131pyridine-5-carboxamide', U.S. National Library of Medicine, Dec. 1, 2012.

* cited by examiner

INHIBITORS OF NICOTINAMIDE N-METHYLTRANSFERASE, COMPOSITIONS AND USES THEREOF

RELATED APPLICATIONS

This application is a § 371 national stage application based on Patent Cooperation Treaty Application No. PCT/US21/18184, filed Feb. 16, 2021; which claims the benefit of priority to U.S. Provisional Patent Application Ser. No. 62/976,588, filed Feb. 14, 2020; and U.S. Provisional Patent Application Ser. No. 63/109,595, filed Nov. 4, 2020.

BACKGROUND

Tumors are heterogeneous, comprising cancer cells and an elaborate microenvironment. Cancer-associated fibroblasts (CAFs) are myofibroblasts (fibroblasts with smooth muscle cell characteristics) present in the tumor microenvironment that support the tumor through paracrine signaling and the production of an extracellular matrix. CAFs play crucial roles in almost all aspects of tumor biology including survival, resistance, metastasis and immune cell evasion. CAFs have now been identified in solid tumors of almost all tissues types, sometimes outnumbering any other cell type in a tumor and associated with a poor prognosis in patients. CAF-driven build-up of extracellular matrix has been shown to prevent the infiltration of effector immune cells and activated T cells. Thus, reducing the presence of CAFs in tumors may improve responses and resistance to immunotherapies. Given their intimate role in cancer maintenance, progression and resistance to targeted therapies and immunotherapies, therapeutics specifically targeting CAFs hold enormous promise as a new approach in cancer treatment. However, few targets that are specific to CAFs (versus normal fibroblasts) have been identified. The most advanced effort in targeting CAFs has been with fibroblast activating protein (FAP)-recognizing CAR T cells. Although this therapy has shown promise, FAP is expressed by other cells in the body, including ones regulating bone marrow and muscle tissue, sometimes resulting in lethal toxicity.

To identify targets that are specific to CAFs, proteins that are differentially expressed in human CAFs but not tumor cells or normal stroma have been identified. Specifically, biopsy samples from patients with high-grade serous carcinoma metastases (HGSC—the most common form of ovarian cancer) underwent laser microdissection to separate tumor cells from stroma followed by mass spectrometry. It was found that expression of nicotinamide N-methyltransferase (NNMT) was increased in stroma of HGSC metastases compared to tumor cells or normal stroma. NNMT was also highly expressed in breast and colon cancer stroma. Importantly, NNMT was required to maintain the CAF phenotype. Furthermore, tumor burden in animal models was reduced when NNMT was knocked down or inhibited with a small molecule inhibitor. These studies indicate that NNMT is a CAF-selective therapeutic target and its inhibition with small molecules reverses the CAF phenotype and reduces tumor burden.

Therefore, there is a continuing need to discover and develop new compounds to target nicotinamide N-methyltransferase (NNMT).

SUMMARY

In certain embodiments, the present application discloses compounds of Formula I having the structure:

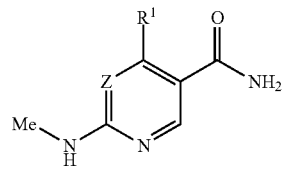

I or a pharmaceutically acceptable salt or prodrug thereof, wherein Z and $R^1$ are as defined herein.

Further, provided are pharmaceutical compositions comprising a compound disclosed herein. The disclosure also relates to methods of treating or preventing cancer in a subject and methods of inhibiting tumor growth in subject.

DETAILED DESCRIPTION

Figure 1:
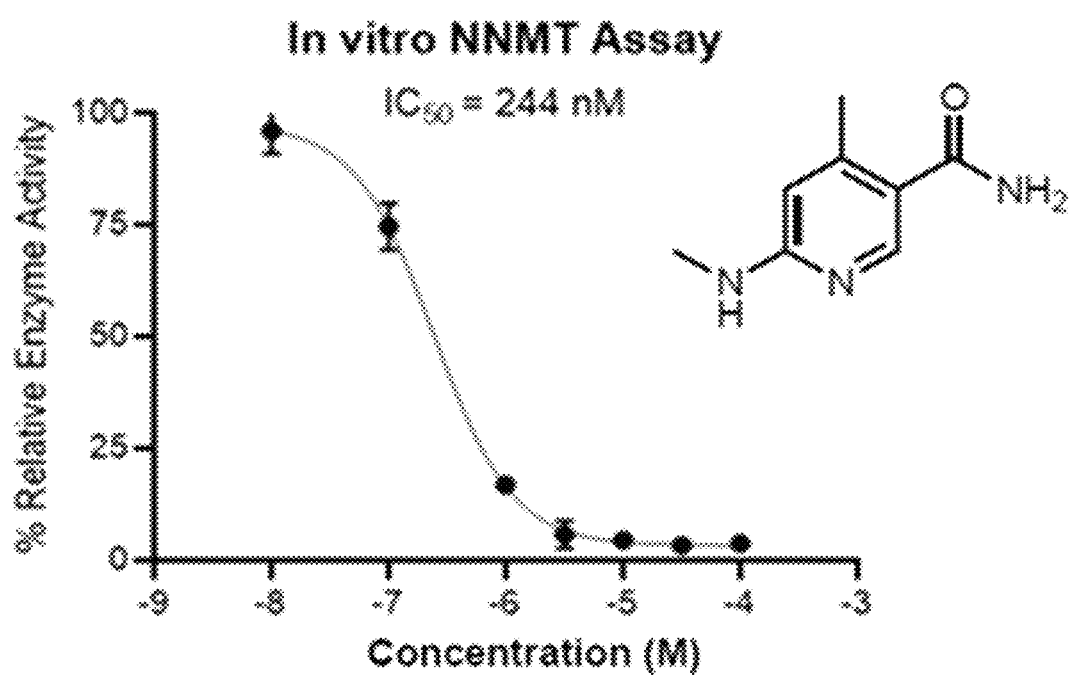
FIG. 1 is a plot showing data from an in vitro NNMT enzyme inhibition assay for Compound 4 ($IC_{50}$=244 nM).

In certain aspects, the present application discloses substituted nicotinamide compounds and pharmaceutical compositions thereof. In particular, such compounds disclosed herein are useful as inhibitors of nicotinamide N-methyltransferase (NNMT).

NNMT catalyzes the methylation of nicotinamide using S-adenosylmethionine (SAM) as a cofactor, which generates 1-methyl nicotinamide (1-MNA). Not wishing to be bound by theory, high expression of NNMT may maintain the CAF phenotype by reducing SAM levels, which would lead to DNA and histone hypomethylation and epigenetic/transcriptional alterations that maintain the CAF cell state. This theory is supported by three observations: 1) NNMT is a 'methyl sink' that reduces SAM levels and histone methylation 2) NNMT knockdown in CAFs increases trimethylation of histone 3 lysines 4 and 27 and 3) inhibition of histone methyltransferase EZH2 rescues NNMT knockdown and restores the CAF phenotype (α-SMA and collagen contractility).

Thus, the compound disclosed herein can be used as an inhibitor of NNMT, which is particularly useful with respect to treating cancer, such as cancerous tumors associated with CAFs having an increased expression of NNMT. In fact, the present application derives from the finding of an unexpected increase in potency of compound 4 in in vitro and in vivo NNMT inhibition assays compared to other nicotinamide compounds.

I. Compounds

In certain embodiments, the present application discloses a compound of Formula I

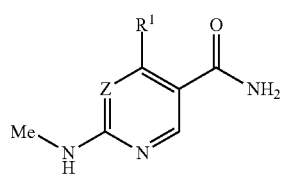

or a pharmaceutically acceptable salt or prodrug thereof;
wherein
$R^1$ is halo, cyano, optionally substituted alkyl, cycloalkyl, or alkynyl; and
Z is N or CH;
provided that if Z is N, then $R^1$ is not $CH_3$.

In some embodiments, Z is CH. In some embodiments, Z is N.

In some embodiments, $R^1$ is optionally substituted alkyl, preferably optionally substituted lower alkyl, more preferably substituted methyl.

In some embodiments, $R^1$ is substituted with halo, preferably fluoro.

In some embodiments, $R^1$ is $CF_3$ or $CHF_2$.

In some embodiments, $R^1$ is alkynyl, preferably lower alkynyl, more preferably ethynyl.

In some embodiments, $R^1$ is halo, preferably chloro.

In some embodiments, $R^1$ is cyano.

In some embodiments, $R^1$ is cycloalkyl, preferably lower cycloalkyl, more preferably cyclopropyl.

Exemplary compounds of Formula I are depicted in Table 1.

TABLE 1

Exemplary Compounds of Formula I

| Compound No. | Structure |
|---|---|
| 4 | ![structure] |
| 5 | ![structure] |
| 6 | ![structure] |
| 7 | ![structure] |
| 8 | ![structure] |
| 12 | ![structure] |
| 13 | ![structure] |

TABLE 2

Other Exemplary Compounds

| Compound No. | Structure |
|---|---|
| 9 | 2-(methylamino)pyrimidine-5-carboxamide with H at position 4 (Me-NH on pyrimidine 2-position; C(=O)NH$_2$ at 5-position) |
| 11 | 4-methyl-2-(methylamino)pyrimidine-5-carboxamide (CH$_3$ at 4-position; Me-NH at 2-position; C(=O)NH$_2$ at 5-position) |

II. Methods

In certain embodiments, the present application discloses a method of treating or preventing a cancer, comprising administering to a subject in need thereof an effective amount of a compound or a pharmaceutically acceptable salt thereof or a composition disclosed herein to thereby treat or prevent the cancer.

In some embodiments, the compound is a compound of Formula I, preferably a compound selected from Table 1. In some embodiments, the compound is a compound selected from Table 2.

In some embodiments, the cancer is brain cancer, head and neck cancer, breast cancer, lung cancer, esophageal cancer, stomach cancer, duodenal cancer, appendix cancer, colon cancer, rectal cancer, liver cancer, pancreatic cancer, gallbladder cancer, anal cancer, kidney cancer, ureteral cancer, bladder cancer, prostate cancer, testicular cancer, uterine cancer, ovarian cancer, or skin cancer. Preferably, the cancer is ovarian cancer, colon cancer, or breast cancer. In some embodiments, the ovarian cancer is high-grade serous carcinoma (HGSC).

In certain embodiments, the cancer is a solid tumor. In some embodiments, the subject is generally one who has been diagnosed as having a cancerous tumor or one who has been previously treated for a cancerous tumor (e.g., where the tumor has been previously removed by surgery). The cancerous tumor may be a primary tumor and/or a secondary (e.g., metastatic) tumor.

In certain embodiments, this application discloses methods of inhibiting tumor growth, comprising administering to a subject in need thereof an effective amount of a compound or a pharmaceutically acceptable salt thereof or a pharmaceutical composition disclosed herein.

In some embodiments, the methods disclosed herein further comprise conjointly administering to the subject an effective amount of one or more additional chemotherapeutic agents. In certain embodiments, the methods disclosed herein further comprise conjointly administering to the subject an effective amount of radiation therapy.

Chemotherapeutic agents that may be conjointly administered with compounds of the invention include: ABT-263, aminoglutethimide, amsacrine, anastrozole, asparaginase, AZD5363, Bacillus Calmette-Guérin vaccine (bcg), bicalutamide, bleomycin, bortezomib, buserelin, busulfan, campothecin, capecitabine, carboplatin, carfilzomib, carmustine, chlorambucil, chloroquine, cisplatin, cladribine, clodronate, cobimetinib, colchicine, cyclophosphamide, cyproterone, cytarabine, dacarbazine, dactinomycin, daunorubicin, demethoxyviridin, dexamethasone, dichloroacetate, dienestrol, diethylstilbestrol, docetaxel, doxorubicin, epirubicin, estradiol, estramustine, etoposide, everolimus, exemestane, filgrastim, fludarabine, fludrocortisone, fluorouracil and 5-fluorouracil, fluoxymesterone, flutamide, gemcitabine, genistein, goserelin, hydroxyurea, idarubicin, ifosfamide, imatinib, interferon, irinotecan, lenalidomide, letrozole, leucovorin, leuprolide, levamisole, lomustine, lonidamine, LY2603618, mechlorethamine, medroxyprogesterone, megestrol, melphalan, mercaptopurine, mesna, metformin, methotrexate, miltefosine, mitomycin, mitotane, mitoxantrone, MK2206, nilutamide, nocodazole, octreotide, oxaliplatin, paclitaxel, pamidronate, pentostatin, pazopanib, perifosine, PF-04691502, PF477736, plicamycin, pomalidomide, porfimer, procarbazine, raltitrexed, rituximab, romidepsin, selumetinib, sorafenib, streptozocin, sunitinib, suramin, tamoxifen, temozolomide, temsirolimus, teniposide, testosterone, thalidomide, thioguanine, thiotepa, titanocene dichloride, topotecan, trametinib, trastuzumab, tretinoin, vinblastine, vincristine, vindesine, vinorelbine, and vorinostat (SAHA). For example, chemotherapeutic agents that may be conjointly administered with compounds of the invention include: aminoglutethimide, amsacrine, anastrozole, asparaginase, bcg, bicalutamide, bleomycin, bortezomib, buserelin, busulfan, campothecin, capecitabine, carboplatin, carfilzomib, carmustine, chlorambucil, chloroquine, cisplatin, cladribine, clodronate, colchicine, cyclophosphamide, cyproterone, cytarabine, dacarbazine, dactinomycin, daunorubicin, demethoxyviridin, dichloroacetate, dienestrol, diethylstilbestrol, docetaxel, doxorubicin, epirubicin, estradiol, estramustine, etoposide, everolimus, exemestane, filgrastim, fludarabine, fludrocortisone, fluorouracil, fluoxymesterone, flutamide, gemcitabine, genistein, goserelin, hydroxyurea, idarubicin, ifosfamide, imatinib, interferon, irinotecan, lenalidomide, letrozole, leucovorin, leuprolide, levamisole, lomustine, lonidamine, mechlorethamine, medroxyprogesterone, megestrol, melphalan, mercaptopurine, mesna, metformin, methotrexate, mitomycin, mitotane, mitoxantrone, nilutamide, nocodazole, octreotide, oxaliplatin, paclitaxel, pamidronate, pentostatin, perifosine, plicamycin, pomalidomide, porfimer, procarbazine, raltitrexed, rituximab, sorafenib, streptozocin, sunitinib, suramin, tamoxifen, temozolomide, temsirolimus, teniposide, testosterone, thalidomide, thioguanine, thiotepa, titanocene dichloride, topotecan, trastuzumab, tretinoin, vinblastine, vincristine, vindesine, and vinorelbine. In certain embodiments, the chemotherapeutic agent is cisplatin. In certain embodiments, the additional chemotherapeutic agent is an CHK1 inhibitor.

Many combination therapies have been developed for the treatment of cancer. In certain embodiments, compounds of the invention may be conjointly administered with a combination therapy. Examples of combination therapies with which compounds of the invention may be conjointly administered are included in Table 3.

TABLE 3

Exemplary combinatorial therapies for the treatment of cancer.

| Name | Therapeutic agents |
|---|---|
| ABV | Doxorubicin, Bleomycin, Vinblastine |
| ABVD | Doxorubicin, Bleomycin, Vinblastine, Dacarbazine |

TABLE 3-continued

Exemplary combinatorial therapies for the treatment of cancer.

| Name | Therapeutic agents |
|---|---|
| AC (Breast) | Doxorubicin, Cyclophosphamide |
| AC (Sarcoma) | Doxorubicin, Cisplatin |
| AC (Neuroblastoma) | Cyclophosphamide, Doxorubicin |
| ACE | Cyclophosphamide, Doxorubicin, Etoposide |
| ACe | Cyclophosphamide, Doxorubicin |
| AD | Doxorubicin, Dacarbazine |
| AP | Doxorubicin, Cisplatin |
| ARAC-DNR | Cytarabine, Daunorubicin |
| B-CAVe | Bleomycin, Lomustine, Doxorubicin, Vinblastine |
| BCVPP | Carmustine, Cyclophosphamide, Vinblastine, Procarbazine, Prednisone |
| BEACOPP | Bleomycin, Etoposide, Doxorubicin, Cyclophosphamide, Vincristine, Procarbazine, Prednisone, Filgrastim |
| BEP | Bleomycin, Etoposide, Cisplatin |
| BIP | Bleomycin, Cisplatin, Ifosfamide, Mesna |
| BOMP | Bleomycin, Vincristine, Cisplatin, Mitomycin |
| CA | Cytarabine, Asparaginase |
| CABO | Cisplatin, Methotrexate, Bleomycin, Vincristine |
| CAF | Cyclophosphamide, Doxorubicin, Fluorouracil |
| CAL-G | Cyclophosphamide, Daunorubicin, Vincristine, Prednisone, Asparaginase |
| CAMP | Cyclophosphamide, Doxorubicin, Methotrexate, Procarbazine |
| CAP | Cyclophosphamide, Doxorubicin, Cisplatin |
| CaT | Carboplatin, Paclitaxel |
| CAV | Cyclophosphamide, Doxorubicin, Vincristine |
| CAVE ADD | CAV and Etoposide |
| CA-VP16 | Cyclophosphamide, Doxorubicin, Etoposide |
| CC | Cyclophosphamide, Carboplatin |
| CDDP/VP-16 | Cisplatin, Etoposide |
| CEF | Cyclophosphamide, Epirubicin, Fluorouracil |
| CEPP(B) | Cyclophosphamide, Etoposide, Prednisone, with or without/Bleomycin |
| CEV | Cyclophosphamide, Etoposide, Vincristine |
| CF | Cisplatin, Fluorouracil or Carboplatin Fluorouracil |
| CHAP | Cyclophosphamide or Cyclophosphamide, Altretamine, Doxorubicin, Cisplatin |
| ChlVPP | Chlorambucil, Vinblastine, Procarbazine, Prednisone |
| CHOP | Cyclophosphamide, Doxorubicin, Vincristine, Prednisone |
| CHOP-BLEO | Add Bleomycin to CHOP |
| CISCA | Cyclophosphamide, Doxorubicin, Cisplatin |
| CLD-BOMP | Bleomycin, Cisplatin, Vincristine, Mitomycin |
| CMF | Methotrexate, Fluorouracil, Cyclophosphamide |
| CMFP | Cyclophosphamide, Methotrexate, Fluorouracil, Prednisone |
| CMFVP | Cyclophosphamide, Methotrexate, Fluorouracil, Vincristine, Prednisone |
| CMV | Cisplatin, Methotrexate, Vinblastine |
| CNF | Cyclophosphamide, Mitoxantrone, Fluorouracil |
| CNOP | Cyclophosphamide, Mitoxantrone, Vincristine, Prednisone |
| COB | Cisplatin, Vincristine, Bleomycin |
| CODE | Cisplatin, Vincristine, Doxorubicin, Etoposide |
| COMLA | Cyclophosphamide, Vincristine, Methotrexate, Leucovorin, Cytarabine |
| COMP | Cyclophosphamide, Vincristine, Methotrexate, Prednisone |
| Cooper Regimen | Cyclophosphamide, Methotrexate, Fluorouracil, Vincristine, Prednisone |
| COP | Cyclophosphamide, Vincristine, Prednisone |
| COPE | Cyclophosphamide, Vincristine, Cisplatin, Etoposide |
| COPP | Cyclophosphamide, Vincristine, Procarbazine, Prednisone |
| CP(Chronic lymphocytic leukemia) | Chlorambucil, Prednisone |
| CP (Ovarian Cancer) | Cyclophosphamide, Cisplatin |
| CT | Cisplatin, Paclitaxel |
| CVD | Cisplatin, Vinblastine, Dacarbazine |
| CVI | Carboplatin, Etoposide, Ifosfamide, Mesna |
| CVP | Cyclophosphamide, Vincristine, Prednisome |
| CVPP | Lomustine, Procarbazine, Prednisone |
| CYVADIC | Cyclophosphamide, Vincristine, Doxorubicin, Dacarbazine |
| DA | Daunorubicin, Cytarabine |
| DAT | Daunorubicin, Cytarabine, Thioguanine |
| DAV | Daunorubicin, Cytarabine, Etoposide |
| DCT | Daunorubicin, Cytarabine, Thioguanine |
| DHAP | Cisplatin, Cytarabine, Dexamethasone |
| DI | Doxorubicin, Ifosfamide |
| DTIC/Tamoxifen | Dacarbazine, Tamoxifen |
| DVP | Daunorubicin, Vincristine, Prednisone |
| EAP | Etoposide, Doxorubicin, Cisplatin |
| EC | Etoposide, Carboplatin |
| EFP | Etoposie, Fluorouracil, Cisplatin |
| ELF | Etoposide, Leucovorin, Fluorouracil |
| EMA 86 | Mitoxantrone, Etoposide, Cytarabine |
| EP | Etoposide, Cisplatin |
| EVA | Etoposide, Vinblastine |
| FAC | Fluorouracil, Doxorubicin, Cyclophosphamide |
| FAM | Fluorouracil, Doxorubicin, Mitomycin |
| FAMTX | Methotrexate, Leucovorin, Doxorubicin |
| FAP | Fluorouracil, Doxorubicin, Cisplatin |
| F-CL | Fluorouracil, Leucovorin |
| FEC | Fluorouracil, Cyclophosphamide, Epirubicin |
| FED | Fluorouracil, Etoposide, Cisplatin |
| FL | Flutamide, Leuprolide |
| FZ | Flutamide, Goserelin acetate implant |
| HDMTX | Methotrexate, Leucovorin |
| Hexa-CAF | Altretamine, Cyclophosphamide, Methotrexate, Fluorouracil |
| ICE-T | Ifosfamide, Carboplatin, Etoposide, Paclitaxel, Mesna |
| IDMTX/6-MP | Methotrexate, Mercaptopurine, Leucovorin |
| IE | Ifosfamide, Etoposie, Mesna |
| IfoVP | Ifosfamide, Etoposide, Mesna |
| IPA | Ifosfamide, Cisplatin, Doxorubicin |
| M-2 | Vincristine, Carmustine, Cyclophosphamide, Prednisone, Melphalan |
| MAC-III | Methotrexate, Leucovorin, Dactinomycin, Cyclophosphamide |
| MACC | Methotrexate, Doxorubicin, Cyclophosphamide, Lomustine |
| MACOP-B | Methotrexate, Leucovorin, Doxorubicin, Cyclophosphamide, Vincristine, Bleomycin, Prednisone |
| MAID | Mesna, Doxorubicin, Ifosfamide, Dacarbazine |
| m-BACOD | Bleomycin, Doxorubicin, Cyclophosphamide, Vincristine, Dexamethasone, Methotrexate, Leucovorin |
| MBC | Methotrexate, Bleomycin, Cisplatin |
| MC | Mitoxantrone, Cytarabine |
| MF | Methotrexate, Fluorouracil, Leucovorin |
| MICE | Ifosfamide, Carboplatin, Etoposide, Mesna |
| MINE | Mesna, Ifosfamide, Mitoxantrone, Etoposide |
| mini-BEAM | Carmustine, Etoposide, Cytarabine, Melphalan |
| MOBP | Bleomycin, Vincristine, Cisplatin, Mitomycin |
| MOP | Mechlorethamine, Vincristine, Procarbazine |
| MOPP | Mechlorethamine, Vincristine, Procarbazine, Prednisone |
| MOPP/ABV | Mechlorethamine, Vincristine, Procarbazine, Prednisone, Doxorubicin, Bleomycin, Vinblastine |
| MP (multiple myeloma) | Melphalan, Prednisone |
| MP (prostate cancer) | Mitoxantrone, Prednisone |
| MTX/6-MO | Methotrexate, Mercaptopurine |
| MTX/6-MP/VP | Methotrexate, Mercaptopurine, Vincristine, Prednisone |
| MTX-CDDPAdr | Methotrexate, Leucovorin, Cisplatin, Doxorubicin |
| MV (breast cancer) | Mitomycin, Vinblastine |
| MV (acute myelocytic leukemia) | Mitoxantrone, Etoposide |

TABLE 3-continued

Exemplary combinatorial therapies for the treatment of cancer.

| Name | Therapeutic agents |
|---|---|
| M-VAC | Vinblastine, Doxorubicin, Cisplatin |
| Methotrexate | |
| MVP Mitomycin | Vinblastine, Cisplatin |
| MVPP | Mechlorethamine, Vinblastine, Procarbazine, Prednisone |
| NFL | Mitoxantrone, Fluorouracil, Leucovorin |
| NOVP | Mitoxantrone, Vinblastine, Vincristine |
| OPA | Vincristine, Prednisone, Doxorubicin |
| OPPA | Add Procarbazine to OPA. |
| PAC | Cisplatin, Doxorubicin |
| PAC-I | Cisplatin, Doxorubicin, Cyclophosphamide |
| PA-CI | Cisplatin, Doxorubicin |
| PC | Paclitaxel, Carboplatin or Paclitaxel, Cisplatin |
| PCV | Lomustine, Procarbazine, Vincristine |
| PE | Paclitaxel, Estramustine |
| PFL | Cisplatin, Fluorouracil, Leucovorin |
| POC | Prednisone, Vincristine, Lomustine |
| ProMACE | Prednisone, Methotrexate, Leucovorin, Doxorubicin, Cyclophosphamide, Etoposide |
| ProMACE/cytaBOM | Prednisone, Doxorubicin, Cyclophosphamide, Etoposide, Cytarabine, Bleomycin, Vincristine, Methotrexate, Leucovorin, Cotrimoxazole |
| PROMACE/MOPP | Prednisone, Doxorubicin, Cyclophosphamide, Etoposide, Mechlorethamine, Vincristine, Procarbazine, Methotrexate, Leucovorin |
| Pt/VM | Cisplatin, Teniposide |
| PVA | Prednisone, Vincristine, Asparaginase |
| PVB | Cisplatin, Vinblastine, Bleomycin |
| PVDA | Prednisone, Vincristine, Daunorubicin, Asparaginase |
| SMF | Streptozocin, Mitomycin, Fluorouracil |
| TAD | Mechlorethamine, Doxorubicin, Vinblastine, Vincristine, Bleomycin, Etoposide, Prednisone |
| TCF | Paclitaxel, Cisplatin, Fluorouracil |
| TIP | Paclitaxel, Ifosfamide, Mesna, Cisplatin |
| TTT | Methotrexate, Cytarabine, Hydrocortisone |
| Topo/CTX | Cyclophosphamide, Topotecan, Mesna |
| VAB-6 | Cyclophosphamide, Dactinomycin, Vinblastine, Cisplatin, Bleomycin |
| VAC | Vincristine, Dactinomycin, Cyclophosphamide |
| VACAdr | Vincristine, Cyclophosphamide, Doxorubicin, Dactinomycin, Vincristine |
| VAD | Vincristine, Doxorubicin, Dexamethasone |
| VATH | Vinblastine, Doxorubicin, Thiotepa, Flouxymesterone |
| VBAP | Vincristine, Carmustine, Doxorubicin, Prednisone |
| VBCMP | Vincristine, Carmustine, Melphalan, Cyclophosphamide, Prednisone |
| VC | Vinorelbine, Cisplatin |
| VCAP | Vincristine, Cyclophosphamide, Doxorubicin, Prednisone |
| VD | Vinorelbine, Doxorubicin |
| VelP | Vinblastine, Cisplatin, Ifosfamide, Mesna |
| VIP | Etoposide, Cisplatin, Ifosfamide, Mesna |
| VM | Mitomycin, Vinblastine |
| VMCP | Vincristine, Melphalan, Cyclophosphamide, Prednisone |
| VP | Etoposide, Cisplatin |
| V-TAD | Etoposide, Thioguanine, Daunorubicin, Cytarabine |
| 5 + 2 | Cytarabine, Daunorubicin, Mitoxantrone |
| 7 + 3 | Cytarabine with/, Daunorubicin or Idarubicin or Mitoxantrone |
| "8 in 1" | Methylprednisolone, Vincristine, Lomustine, Procarbazine, Hydroxyurea, Cisplatin, Cytarabine, Dacarbazine |

In some embodiments, the conjointly administered chemotherapeutic agent is an immune-oncology therapeutic, such as an inhibitor of CTLA-4, indoleamine 2,3-dioxygenase, and/or PD-1/PD-L1.

In certain embodiments, the compound of Formula I or a pharmaceutically acceptable salt or prodrug thereof and the one or more additional chemotherapeutic agents are administered simultaneously. In alternative embodiments, the one or more additional chemotherapeutic agents are administered within about 5 minutes to within about 168 hours prior to or after administration of the compound of Formula I.

In certain embodiments, the subject is a mammal, e.g., a human.

In certain embodiments, disclosed herein are methods of inhibiting NNMT comprising contacting a cell expressing NNMT with a compound of Formula I

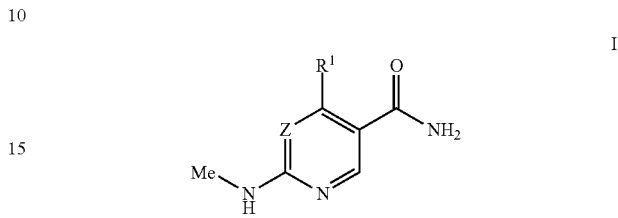

or a pharmaceutically acceptable salt or prodrug thereof; wherein $R^1$ is H, halo, cyano, optionally substituted alkyl, cycloalkyl, or alkynyl; and Z is N or CH;

provided that if Z is N, then $R^1$ is not $CH_3$.

In certain embodiments, the cell is a cancer cell. Such methods may be performed in vivo or in vitro.

Pharmaceutical Compositions

In certain embodiments, the present invention provides pharmaceutical compositions comprising a compound of Formula I

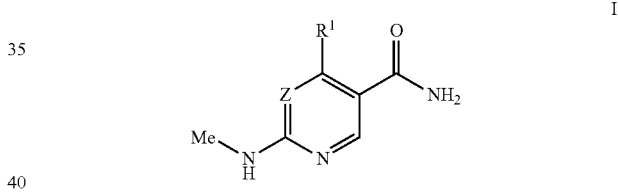

or a pharmaceutically acceptable salt or prodrug thereof; and a pharmaceutically acceptable carrier;

wherein $R^1$ is halo, cyano, optionally substituted alkyl, cycloalkyl, or alkynyl; and Z is N or CH;

provided that if Z is N, then $R^1$ is not $CH_3$.

The compositions and methods of the present invention may be utilized to treat an individual in need thereof. In certain embodiments, the individual is a mammal such as a human, or a non-human mammal. When administered to an animal, such as a human, the composition or the compound is preferably administered as a pharmaceutical composition comprising, for example, a compound of the invention and a pharmaceutically acceptable carrier.

Pharmaceutically acceptable carriers are well known in the art and include, for example, aqueous solutions such as water or physiologically buffered saline or other solvents or vehicles such as glycols, glycerol, oils such as olive oil, or injectable organic esters. In a preferred embodiment, when such pharmaceutical compositions are for human administration, particularly for invasive routes of administration (i.e., routes, such as injection or implantation, that circumvent transport or diffusion through an epithelial barrier), the aqueous solution is pyrogen-free, or substantially pyrogen-free. The excipients can be chosen, for example, to effect delayed release of an agent or to selectively target one or more cells, tissues or organs. The pharmaceutical composition can be in dosage unit form such as tablet, capsule (including sprinkle capsule and gelatin capsule), granule, lyophile for reconstitution, powder, solution, syrup, suppository, injection or the like. The composition can also be present in a transdermal delivery system, e.g., a skin patch. The composition can also be present in a solution suitable for topical administration, such as an eye drop.

A pharmaceutically acceptable carrier can contain physiologically acceptable agents that act, for example, to stabilize, increase solubility or to increase the absorption of a compound such as a compound of the invention. Such physiologically acceptable agents include, for example, carbohydrates, such as glucose, sucrose or dextrans, antioxidants, such as ascorbic acid or glutathione, chelating agents, low molecular weight proteins or other stabilizers or excipients. The choice of a pharmaceutically acceptable carrier, including a physiologically acceptable agent, depends, for example, on the route of administration of the composition. The preparation or pharmaceutical composition can be a self-emulsifying drug delivery system or a self-microemulsifying drug delivery system. The pharmaceutical composition (preparation) also can be a liposome or other polymer matrix, which can have incorporated therein, for example, a compound of the invention. Liposomes, for example, which comprise phospholipids or other lipids, are nontoxic, physiologically acceptable and metabolizable carriers that are relatively simple to make and administer.

A pharmaceutical composition (preparation) can be administered to a subject by any of a number of routes of administration including, for example, orally (for example, drenches as in aqueous or non-aqueous solutions or suspensions, tablets, capsules (including sprinkle capsules and gelatin capsules), boluses, powders, granules, pastes for application to the tongue); absorption through the oral mucosa (e.g., sublingually); anally, rectally or vaginally (for example, as a pessary, cream or foam); parenterally (including intramuscularly, intravenously, subcutaneously or intrathecally as, for example, a sterile solution or suspension); nasally; intraperitoneally; subcutaneously; transdermally (for example as a patch applied to the skin); and topically (for example, as a cream, ointment or spray applied to the skin, or as an eye drop). The compound may also be formulated for inhalation. In certain embodiments, a compound may be simply dissolved or suspended in sterile water. Details of appropriate routes of administration and compositions suitable for same can be found in, for example, U.S. Pat. Nos. 6,110,973, 5,731,000, 5,541,231, 5,427,798, 5,358,970 and 4,172,896, as well as in patents cited therein.

The formulations may conveniently be presented in unit dosage form and may be prepared by any methods well known in the art of pharmacy. The amount of active ingredient which can be combined with a carrier material to produce a single dosage form will vary depending upon the host being treated, the particular mode of administration. The amount of active ingredient that can be combined with a carrier material to produce a single dosage form will generally be that amount of the compound which produces a therapeutic effect. Generally, out of one hundred percent, this amount will range from about 1 percent to about ninety-nine percent of active ingredient, preferably from about 5 percent to about 70 percent, most preferably from about 10 percent to about 30 percent.

Methods of preparing these formulations or compositions include the step of bringing into association an active compound, such as a compound of the invention, with the carrier and, optionally, one or more accessory ingredients. In general, the formulations are prepared by uniformly and intimately bringing into association a compound of the present invention with liquid carriers, or finely divided solid carriers, or both, and then, if necessary, shaping the product.

Formulations of the invention suitable for oral administration may be in the form of capsules (including sprinkle capsules and gelatin capsules), cachets, pills, tablets, lozenges (using a flavored basis, usually sucrose and acacia or tragacanth), lyophile, powders, granules, or as a solution or a suspension in an aqueous or non-aqueous liquid, or as an oil-in-water or water-in-oil liquid emulsion, or as an elixir or syrup, or as pastilles (using an inert base, such as gelatin and glycerin, or sucrose and acacia) and/or as mouth washes and the like, each containing a predetermined amount of a compound of the present invention as an active ingredient. Compositions or compounds may also be administered as a bolus, electuary or paste.

To prepare solid dosage forms for oral administration (capsules (including sprinkle capsules and gelatin capsules), tablets, pills, dragees, powders, granules and the like), the active ingredient is mixed with one or more pharmaceutically acceptable carriers, such as sodium citrate or dicalcium phosphate, and/or any of the following: (1) fillers or extenders, such as starches, lactose, sucrose, glucose, mannitol, and/or silicic acid; (2) binders, such as, for example, carboxymethylcellulose, alginates, gelatin, polyvinyl pyrrolidone, sucrose and/or acacia; (3) humectants, such as glycerol; (4) disintegrating agents, such as agar-agar, calcium carbonate, potato or tapioca starch, alginic acid, certain silicates, and sodium carbonate; (5) solution retarding agents, such as paraffin; (6) absorption accelerators, such as quaternary ammonium compounds; (7) wetting agents, such as, for example, cetyl alcohol and glycerol monostearate; (8) absorbents, such as kaolin and bentonite clay; (9) lubricants, such a talc, calcium stearate, magnesium stearate, solid polyethylene glycols, sodium lauryl sulfate, and mixtures thereof; (10) complexing agents, such as, modified and unmodified cyclodextrins; and (11) coloring agents. In the case of capsules (including sprinkle capsules and gelatin capsules), tablets and pills, the pharmaceutical compositions may also comprise buffering agents. Solid compositions of a similar type may also be employed as fillers in soft and hard-filled gelatin capsules using such excipients as lactose or milk sugars, as well as high molecular weight polyethylene glycols and the like.

A tablet may be made by compression or molding, optionally with one or more accessory ingredients. Compressed tablets may be prepared using binder (for example, gelatin or hydroxypropylmethyl cellulose), lubricant, inert diluent, preservative, disintegrant (for example, sodium starch glycolate or cross-linked sodium carboxymethyl cellulose), surface-active or dispersing agent. Molded tablets may be made by molding in a suitable machine a mixture of the powdered compound moistened with an inert liquid diluent.

The tablets, and other solid dosage forms of the pharmaceutical compositions, such as dragees, capsules (including sprinkle capsules and gelatin capsules), pills and granules, may optionally be scored or prepared with coatings and shells, such as enteric coatings and other coatings well known in the pharmaceutical-formulating art. They may also be formulated so as to provide slow or controlled release of the active ingredient therein using, for example, hydroxypropylmethyl cellulose in varying proportions to provide the desired release profile, other polymer matrices, liposomes and/or microspheres. They may be sterilized by, for example, filtration through a bacteria-retaining filter, or by incorporating sterilizing agents in the form of sterile solid compositions that can be dissolved in sterile water, or some other sterile injectable medium immediately before use. These compositions may also optionally contain opacifying agents and may be of a composition that they release the active ingredient(s) only, or preferentially, in a certain portion of the gastrointestinal tract, optionally, in a delayed manner. Examples of embedding compositions that can be used include polymeric substances and waxes. The active ingredient can also be in micro-encapsulated form, if appropriate, with one or more of the above-described excipients.

Liquid dosage forms useful for oral administration include pharmaceutically acceptable emulsions, lyophiles for reconstitution, microemulsions, solutions, suspensions, syrups and elixirs. In addition to the active ingredient, the liquid dosage forms may contain inert diluents commonly used in the art, such as, for example, water or other solvents, cyclodextrins and derivatives thereof, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, and mixtures thereof.

Besides inert diluents, the oral compositions can also include adjuvants such as wetting agents, emulsifying and suspending agents, sweetening, flavoring, coloring, perfuming and preservative agents.

Suspensions, in addition to the active compounds, may contain suspending agents as, for example, ethoxylated isostearyl alcohols, polyoxyethylene sorbitol and sorbitan esters, microcrystalline cellulose, aluminum metahydroxide, bentonite, agar-agar and tragacanth, and mixtures thereof.

Formulations of the pharmaceutical compositions for rectal, vaginal, or urethral administration may be presented as a suppository, which may be prepared by mixing one or more active compounds with one or more suitable nonirritating excipients or carriers comprising, for example, cocoa butter, polyethylene glycol, a suppository wax or a salicylate, and which is solid at room temperature, but liquid at body temperature and, therefore, will melt in the rectum or vaginal cavity and release the active compound.

Formulations of the pharmaceutical compositions for administration to the mouth may be presented as a mouthwash, or an oral spray, or an oral ointment.

Alternatively or additionally, compositions can be formulated for delivery via a catheter, stent, wire, or other intraluminal device. Delivery via such devices may be especially useful for delivery to the bladder, urethra, ureter, rectum, or intestine.

Formulations which are suitable for vaginal administration also include pessaries, tampons, creams, gels, pastes, foams or spray formulations containing such carriers as are known in the art to be appropriate.

Dosage forms for the topical or transdermal administration include powders, sprays, ointments, pastes, creams, lotions, gels, solutions, patches and inhalants. The active compound may be mixed under sterile conditions with a pharmaceutically acceptable carrier, and with any preservatives, buffers, or propellants that may be required.

The ointments, pastes, creams and gels may contain, in addition to an active compound, excipients, such as animal and vegetable fats, oils, waxes, paraffins, starch, tragacanth, cellulose derivatives, polyethylene glycols, silicones, bentonites, silicic acid, talc and zinc oxide, or mixtures thereof.

Powders and sprays can contain, in addition to an active compound, excipients such as lactose, talc, silicic acid, aluminum hydroxide, calcium silicates and polyamide powder, or mixtures of these substances. Sprays can additionally contain customary propellants, such as chlorofluorohydrocarbons and volatile unsubstituted hydrocarbons, such as butane and propane.

Transdermal patches have the added advantage of providing controlled delivery of a compound of the present invention to the body. Such dosage forms can be made by dissolving or dispersing the active compound in the proper medium. Absorption enhancers can also be used to increase the flux of the compound across the skin. The rate of such flux can be controlled by either providing a rate controlling membrane or dispersing the compound in a polymer matrix or gel.

Ophthalmic formulations, eye ointments, powders, solutions and the like, are also contemplated as being within the scope of this invention. Exemplary ophthalmic formulations are described in U.S. Publication Nos. 2005/0080056, 2005/0059744, 2005/0031697 and 2005/004074 and U.S. Pat. No. 6,583,124, the contents of which are incorporated herein by reference. If desired, liquid ophthalmic formulations have properties similar to that of lacrimal fluids, aqueous humor or vitreous humor or are compatible with such fluids. A preferred route of administration is local administration (e.g., topical administration, such as eye drops, or administration via an implant).

The phrases "parenteral administration" and "administered parenterally" as used herein means modes of administration other than enteral and topical administration, usually by injection, and includes, without limitation, intravenous, intramuscular, intraarterial, intrathecal, intracapsular, intraorbital, intracardiac, intradermal, intraperitoneal, transtracheal, subcutaneous, subcuticular, intraarticular, subcapsular, subarachnoid, intraspinal and intrasternal injection and infusion. Pharmaceutical compositions suitable for parenteral administration comprise one or more active compounds in combination with one or more pharmaceutically acceptable sterile isotonic aqueous or nonaqueous solutions, dispersions, suspensions or emulsions, or sterile powders which may be reconstituted into sterile injectable solutions or dispersions just prior to use, which may contain antioxidants, buffers, bacteriostats, solutes which render the formulation isotonic with the blood of the intended recipient or suspending or thickening agents.

Examples of suitable aqueous and nonaqueous carriers that may be employed in the pharmaceutical compositions of the invention include water, ethanol, polyols (such as glycerol, propylene glycol, polyethylene glycol, and the like), and suitable mixtures thereof, vegetable oils, such as olive oil, and injectable organic esters, such as ethyl oleate. Proper fluidity can be maintained, for example, by the use of coating materials, such as lecithin, by the maintenance of the required particle size in the case of dispersions, and by the use of surfactants.

These compositions may also contain adjuvants such as preservatives, wetting agents, emulsifying agents and dispersing agents. Prevention of the action of microorganisms may be ensured by the inclusion of various antibacterial and antifungal agents, for example, paraben, chlorobutanol, phenol sorbic acid, and the like. It may also be desirable to include isotonic agents, such as sugars, sodium chloride, and the like into the compositions. In addition, prolonged absorption of the injectable pharmaceutical form may be brought about by the inclusion of agents that delay absorption such as aluminum monostearate and gelatin.

In some cases, in order to prolong the effect of a drug, it is desirable to slow the absorption of the drug from subcutaneous or intramuscular injection. This may be accomplished by the use of a liquid suspension of crystalline or amorphous material having poor water solubility. The rate of absorption of the drug then depends upon its rate of dissolution, which, in turn, may depend upon crystal size and crystalline form. Alternatively, delayed absorption of a parenterally administered drug form is accomplished by dissolving or suspending the drug in an oil vehicle.

Injectable depot forms are made by forming microencapsulated matrices of the subject compounds in biodegradable polymers such as polylactide-polyglycolide. Depending on the ratio of drug to polymer, and the nature of the particular polymer employed, the rate of drug release can be controlled. Examples of other biodegradable polymers include poly(orthoesters) and poly(anhydrides). Depot injectable formulations are also prepared by entrapping the drug in liposomes or microemulsions that are compatible with body tissue.

For use in the methods of this invention, active compounds can be given per se or as a pharmaceutical composition containing, for example, 0.1 to 99.5% (more preferably, 0.5 to 90%) of active ingredient in combination with a pharmaceutically acceptable carrier.

Methods of introduction may also be provided by rechargeable or biodegradable devices. Various slow release polymeric devices have been developed and tested in vivo in recent years for the controlled delivery of drugs, including proteinaceous biopharmaceuticals. A variety of biocompatible polymers (including hydrogels), including both biodegradable and non-degradable polymers, can be used to form an implant for the sustained release of a compound at a particular target site.

Actual dosage levels of the active ingredients in the pharmaceutical compositions may be varied so as to obtain an amount of the active ingredient that is effective to achieve the desired therapeutic response for a particular patient, composition, and mode of administration, without being toxic to the patient.

The selected dosage level will depend upon a variety of factors including the activity of the particular compound or combination of compounds employed, or the ester, salt or amide thereof, the route of administration, the time of administration, the rate of excretion of the particular compound(s) being employed, the duration of the treatment, other drugs, compounds and/or materials used in combination with the particular compound(s) employed, the age, sex, weight, condition, general health and prior medical history of the patient being treated, and like factors well known in the medical arts.

A physician or veterinarian having ordinary skill in the art can readily determine and prescribe the therapeutically effective amount of the pharmaceutical composition required. For example, the physician or veterinarian could start doses of the pharmaceutical composition or compound at levels lower than that required in order to achieve the desired therapeutic effect and gradually increase the dosage until the desired effect is achieved. By "therapeutically effective amount" is meant the concentration of a compound that is sufficient to elicit the desired therapeutic effect. It is generally understood that the effective amount of the compound will vary according to the weight, sex, age, and medical history of the subject. Other factors which influence the effective amount may include, but are not limited to, the severity of the patient's condition, the disorder being treated, the stability of the compound, and, if desired, another type of therapeutic agent being administered with the compound of the invention. A larger total dose can be delivered by multiple administrations of the agent. Methods to determine efficacy and dosage are known to those skilled in the art (Isselbacher et al. (1996) Harrison's Principles of Internal Medicine 13 ed., 1814-1882, herein incorporated by reference).

In general, a suitable daily dose of an active compound used in the compositions and methods of the invention will be that amount of the compound that is the lowest dose effective to produce a therapeutic effect. Such an effective dose will generally depend upon the factors described above.

If desired, the effective daily dose of the active compound may be administered as one, two, three, four, five, six or more sub-doses administered separately at appropriate intervals throughout the day, optionally, in unit dosage forms. In certain embodiments of the present invention, the active compound may be administered two or three times daily. In preferred embodiments, the active compound will be administered once daily.

The patient receiving this treatment is any animal in need, including primates, in particular humans, and other mammals such as equines, cattle, swine and sheep; and poultry and pets in general.

In certain embodiments, compounds of the invention may be used alone or conjointly administered with another type of therapeutic agent. As used herein, the phrase "conjoint administration" refers to any form of administration of two or more different therapeutic compounds such that the second compound is administered while the previously administered therapeutic compound is still effective in the body (e.g., the two compounds are simultaneously effective in the patient, which may include synergistic effects of the two compounds). For example, the different therapeutic compounds can be administered either in the same formulation or in a separate formulation, either concomitantly or sequentially. In certain embodiments, the different therapeutic compounds can be administered within one hour, 12 hours, 24 hours, 36 hours, 48 hours, 72 hours, or a week of one another. Thus, an individual who receives such treatment can benefit from a combined effect of different therapeutic compounds.

In certain embodiments, conjoint administration of compounds of the invention with one or more additional therapeutic agent(s) (e.g., one or more additional chemotherapeutic agent(s)) provides improved efficacy relative to each individual administration of the compound of the invention (e.g., compounds of Table 1) or the one or more additional therapeutic agent(s). In certain such embodiments, the conjoint administration provides an additive effect, wherein an additive effect refers to the sum of each of the effects of individual administration of the compound of the invention and the one or more additional therapeutic agent(s).

This invention includes the use of pharmaceutically acceptable salts of compounds of the invention in the compositions and methods of the present invention. The term "pharmaceutically acceptable salt" as used herein includes salts derived from inorganic or organic acids including, for example, hydrochloric, hydrobromic, sulfuric, nitric, perchloric, phosphoric, formic, acetic, lactic, maleic, fumaric, succinic, tartaric, glycolic, salicylic, citric, methanesulfonic, benzenesulfonic, benzoic, malonic, trifluoroacetic, trichloroacetic, naphthalene-2-sulfonic, and other acids. Pharmaceutically acceptable salt forms can include forms wherein the ratio of molecules comprising the salt is not 1:1. For example, the salt may comprise more than one inorganic or organic acid molecule per molecule of base, such as two hydrochloric acid molecules per molecule of compounds of Table 1. As another example, the salt may comprise less than one inorganic or organic acid molecule per molecule of base, such as two molecules of compounds of Table 1 per molecule of tartaric acid.

In further embodiments, contemplated salts of the invention include, but are not limited to, alkyl, dialkyl, trialkyl or tetra-alkyl ammonium salts. In certain embodiments, contemplated salts of the invention include, but are not limited to, L-arginine, benenthamine, benzathine, betaine, calcium hydroxide, choline, deanol, diethanolamine, diethylamine, 2-(diethylamino) ethanol, ethanolamine, ethylenediamine, N-methylglucamine, hydrabamine, 1H-imidazole, lithium, L-lysine, magnesium, 4-(2-hydroxyethyl) morpholine, piperazine, potassium, 1-(2-hydroxyethyl) pyrrolidine, sodium, triethanolamine, tromethamine, and zinc salts. In certain embodiments, contemplated salts of the invention include, but are not limited to, Na, Ca, K, Mg, Zn or other metal salts.

The pharmaceutically acceptable acid addition salts can also exist as various solvates, such as with water, methanol, ethanol, dimethylformamide, and the like. Mixtures of such solvates can also be prepared. The source of such solvate can be from the solvent of crystallization, inherent in the solvent of preparation or crystallization, or adventitious to such solvent.

Wetting agents, emulsifiers and lubricants, such as sodium lauryl sulfate and magnesium stearate, as well as coloring agents, release agents, coating agents, sweetening, flavoring and perfuming agents, preservatives and antioxidants can also be present in the compositions.

Examples of pharmaceutically acceptable antioxidants include: (1) water-soluble antioxidants, such as ascorbic acid, cysteine hydrochloride, sodium bisulfate, sodium metabisulfite, sodium sulfite and the like; (2) oil-soluble antioxidants, such as ascorbyl palmitate, butylated hydroxyanisole (BHA), butylated hydroxytoluene (BHT), lecithin, propyl gallate, alpha-tocopherol, and the like; and (3) metal-chelating agents, such as citric acid, ethylenediamine tetraacetic acid (EDTA), sorbitol, tartaric acid, phosphoric acid, and the like.

IV. Definitions

For purposes of the present invention, the following definitions will be used (unless expressly stated otherwise):

As used herein, the term "acyl" is art-recognized and refers to a group represented by the general formula hydrocarbylC(O)—, preferably alkylC(O)—.

As used herein, the term "alkoxy" refers to an alkyl group, preferably a lower alkyl group, having an oxygen attached thereto. Representative alkoxy groups include methoxy, —$OCF_3$, ethoxy, propoxy, tert-butoxy and the like.

As used herein, the term "alkenyl", as used herein, refers to an aliphatic group containing at least one double bond and is intended to include both "unsubstituted alkenyls" and "substituted alkenyls", the latter of which refers to alkenyl moieties having substituents replacing a hydrogen on one or more carbons of the alkenyl group. Such substituents may occur on one or more carbons that are included or not included in one or more double bonds. Moreover, such substituents include all those contemplated for alkyl groups, as discussed below, except where stability is prohibitive. For example, substitution of alkenyl groups by one or more alkyl, carbocyclyl, aryl, heterocyclyl, or heteroaryl groups is contemplated.

As used herein, an "alkyl" group or "alkane" is a straight chained or branched non-aromatic hydrocarbon which is completely saturated. Typically, a straight chained or branched alkyl group has from 1 to about 20 carbon atoms, preferably from 1 to about 10 unless otherwise defined. Examples of straight chained and branched alkyl groups include methyl, ethyl, n-propyl, iso-propyl, n-butyl, sec-butyl, tert-butyl, pentyl, hexyl, pentyl and octyl. A $C_1$-$C_6$ straight chained or branched alkyl group is also referred to as a "lower alkyl" group.

Moreover, the term "alkyl" (or "lower alkyl") as used throughout the specification, examples, and claims is intended to include both "unsubstituted alkyls" and "substituted alkyls", the latter of which refers to alkyl moieties having substituents replacing a hydrogen on one or more carbons of the hydrocarbon backbone. Such substituents, if not otherwise specified, can include, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain can themselves be substituted, if appropriate. For instance, the substituents of a substituted alkyl may include substituted and unsubstituted forms of amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —$CF_3$, —CN and the like. Exemplary substituted alkyls are described below. Cycloalkyls can be further substituted with alkyls, alkenyls, alkoxys, alkylthios, aminoalkyls, carbonyl-substituted alkyls, —$CF_3$, —CN, and the like.

As used herein, the term "$C_{x-y}$" when used in conjunction with a chemical moiety, such as, acyl, acyloxy, alkyl, alkenyl, alkynyl, or alkoxy is meant to include groups that contain from x to y carbons in the chain. For example, the term "$C_{x-y}$alkyl" refers to substituted or unsubstituted saturated hydrocarbon groups, including straight-chain alkyl and branched-chain alkyl groups that contain from x to y carbons in the chain, including haloalkyl groups such as trifluoromethyl and 2,2,2-trifluoroethyl, etc. $C_0$ alkyl indicates a hydrogen where the group is in a terminal position, a bond if internal. The terms "$C_{2-y}$alkenyl" and "$C_{2-y}$alkynyl" refer to substituted or unsubstituted unsaturated aliphatic groups analogous in length and possible substitution to the alkyls described above, but that contain at least one double or triple bond respectively.

As used herein, the term "alkynyl", as used herein, refers to an aliphatic group containing at least one triple bond and is intended to include both "unsubstituted alkynyls" and "substituted alkynyls", the latter of which refers to alkynyl moieties having substituents replacing a hydrogen on one or more carbons of the alkynyl group. Such substituents may occur on one or more carbons that are included or not included in one or more triple bonds. Moreover, such substituents include all those contemplated for alkyl groups, as discussed above, except where stability is prohibitive. For example, substitution of alkynyl groups by one or more alkyl, carbocyclyl, aryl, heterocyclyl, or heteroaryl groups is contemplated.

As used herein, the term "amide", as used herein, refers to a group

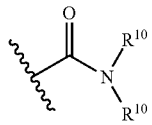

wherein each $R^{10}$ independently represent a hydrogen or hydrocarbyl group, or two $R^{10}$ are taken together with the N atom to which they are attached complete a heterocycle having from 4 to 8 atoms in the ring structure.

As used herein, the terms "amine" and "amino" are art-recognized and refer to both unsubstituted and substituted amines and salts thereof, e.g., a moiety that can be represented

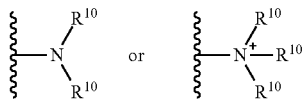

wherein each $R^{10}$ independently represents a hydrogen or a hydrocarbyl group, or two $R^{10}$ are taken together with the N atom to which they are attached complete a heterocycle having from 4 to 8 atoms in the ring structure.

As used herein, the term "aryl" as used herein include substituted or unsubstituted single-ring aromatic groups in which each atom of the ring is carbon. Preferably the ring is a 5- to 7-membered ring, more preferably a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

As used herein, the terms "carbocycle", and "carbocyclic", as used herein, refers to a saturated or unsaturated ring in which each atom of the ring is carbon. The term carbocycle includes both aromatic carbocycles and non-aromatic carbocycles. Non-aromatic carbocycles include both cycloalkane rings, in which all carbon atoms are saturated, and cycloalkene rings, which contain at least one double bond. "Carbocycle" includes 3-7 membered monocyclic and 8-12 membered bicyclic rings. Each ring of a bicyclic carbocycle may be selected from saturated, unsaturated and aromatic rings. Carbocycle includes bicyclic molecules in which one, two or three or more atoms are shared between the two rings. The term "fused carbocycle" refers to a bicyclic carbocycle in which each of the rings shares two adjacent atoms with the other ring. Each ring of a fused carbocycle may be selected from saturated, unsaturated and aromatic rings. In an exemplary embodiment, an aromatic ring, e.g., phenyl, may be fused to a saturated or unsaturated ring, e.g., cyclohexane, cyclopentane, or cyclohexene. Any combination of saturated, unsaturated and aromatic bicyclic rings, as valence permits, is included in the definition of carbocyclic. Exemplary "carbocycles" include cyclopentane, cyclohexane, bicyclo[2.2.1]heptane, 1,5-cyclooctadiene, 1,2,3,4-tetrahydronaphthalene, bicyclo[4.2.0]oct-3-ene, naphthalene and adamantane. Exemplary fused carbocycles include decalin, naphthalene, 1,2,3,4-tetrahydronaphthalene, bicyclo[4.2.0]octane, 4,5,6,7-tetrahydro-1H-indene and bicyclo[4.1.0]hept-3-ene. "Carbocycles" may be substituted at any one or more positions capable of bearing a hydrogen atom.

As used herein, a "cycloalkyl" group is a cyclic hydrocarbon which is completely saturated. "Cycloalkyl" includes monocyclic and bicyclic rings. Typically, a monocyclic cycloalkyl group has from 3 to about 10 carbon atoms, more typically 3 to 8 carbon atoms unless otherwise defined. The second ring of a bicyclic cycloalkyl may be selected from saturated, unsaturated and aromatic rings. Cycloalkyl includes bicyclic molecules in which one, two or three or more atoms are shared between the two rings. The term "fused cycloalkyl" refers to a bicyclic cycloalkyl in which each of the rings shares two adjacent atoms with the other ring. The second ring of a fused bicyclic cycloalkyl may be selected from saturated, unsaturated and aromatic rings. A "cycloalkenyl" group is a cyclic hydrocarbon containing one or more double bonds.

As used herein, the terms "halo" and "halogen" as used herein means halogen and includes chloro, fluoro, bromo, and iodo.

As used herein, the terms "hetaralkyl" and "heteroaralkyl", as used herein, refers to an alkyl group substituted with a hetaryl group.

As used herein, the term "heteroalkyl", as used herein, refers to a saturated or unsaturated chain of carbon atoms and at least one heteroatom, wherein no two heteroatoms are adjacent.

As used herein, the terms "heteroaryl" and "hetaryl" include substituted or unsubstituted aromatic single ring structures, preferably 5- to 7-membered rings, more preferably 5- to 6-membered rings, whose ring structures include at least one heteroatom, preferably one to four heteroatoms, more preferably one or two heteroatoms. The terms "heteroaryl" and "hetaryl" also include polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

As used herein, the term "heteroatom" as used herein means an atom of any element other than carbon or hydrogen. Preferred heteroatoms are nitrogen, oxygen, and sulfur.

As used herein, the terms "heterocyclyl", "heterocycle", and "heterocyclic" refer to substituted or unsubstituted non-aromatic ring structures, preferably 3- to 10-membered rings, more preferably 3- to 7-membered rings, whose ring structures include at least one heteroatom, preferably one to four heteroatoms, more preferably one or two heteroatoms. The terms "heterocyclyl" and "heterocyclic" also include polycyclic ring systems having two or more cyclic rings in which two or more carbons are common to two adjoining rings wherein at least one of the rings is heterocyclic, e.g., the other cyclic rings can be cycloalkyls, cycloalkenyls, cycloalkynyls, aryls, heteroaryls, and/or heterocyclyls. Heterocyclyl groups include, for example, piperidine, piperazine, pyrrolidine, morpholine, lactones, lactams, and the like. Heterocyclyl groups can also be substituted by oxo groups. For example, "heterocyclyl" encompasses both pyrrolidine and pyrrolidinone.

As used herein, the term "hydrocarbyl", as used herein, refers to a group that is bonded through a carbon atom that does not have a =O or =S substituent, and typically has at least one carbon-hydrogen bond and a primarily carbon backbone, but may optionally include heteroatoms. Thus, groups like methyl, ethoxyethyl, 2-pyridyl, and trifluoromethyl are considered to be hydrocarbyl for the purposes of this application, but substituents such as acetyl (which has a =O substituent on the linking carbon) and ethoxy (which is linked through oxygen, not carbon) are not. Hydrocarbyl groups include, but are not limited to aryl, heteroaryl, carbocycle, heterocyclyl, alkyl, alkenyl, alkynyl, and combinations thereof.

As used herein, the term "hydroxyalkyl", as used herein, refers to an alkyl group substituted with a hydroxy group.

As used herein, the term "lower" when used in conjunction with a chemical moiety, such as, acyl, acyloxy, alkyl, alkenyl, alkynyl, or alkoxy is meant to include groups where there are ten or fewer non-hydrogen atoms in the substituent, preferably six or fewer. A "lower alkyl", for example, refers to an alkyl group that contains ten or fewer carbon atoms, preferably six or fewer. In certain embodiments, acyl, acyloxy, alkyl, alkenyl, alkynyl, or alkoxy substituents defined herein are respectively lower acyl, lower acyloxy, lower alkyl, lower alkenyl, lower alkynyl, or lower alkoxy, whether they appear alone or in combination with other substituents, such as in the recitations hydroxyalkyl and aralkyl (in which case, for example, the atoms within the aryl group are not counted when counting the carbon atoms in the alkyl substituent).

As used herein, the term "oxo" refers to a carbonyl group. When an oxo substituent occurs on an otherwise saturated group, such as with an oxo-substituted cycloalkyl group (e.g., 3-oxo-cyclobutyl), the substituted group is still intended to be a saturated group. When a group is referred to as being substituted by an "oxo" group, this can mean that a carbonyl moiety (i.e., —C(=O)—) replaces a methylene unit (i.e., —CH$_2$—).

As used herein, the terms "polycyclyl", "polycycle", and "polycyclic" refer to two or more rings (e.g., cycloalkyls, cycloalkenyls, cycloalkynyls, aryls, heteroaryls, and/or heterocyclyls) in which two or more atoms are common to two adjoining rings, e.g., the rings are "fused rings". Each of the rings of the polycycle can be substituted or unsubstituted. In certain embodiments, each ring of the polycycle contains from 3 to 10 atoms in the ring, preferably from 5 to 7.

As used herein, the term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that substituents can themselves be substituted, if appropriate. Unless specifically stated as "unsubstituted," references to chemical moieties herein are understood to include substituted variants. For example, reference to an "aryl" group or moiety implicitly includes both substituted and unsubstituted variants.

As used herein, the term "administering" means the actual physical introduction of a composition into or onto (as appropriate) a subject. Any and all methods of introducing the composition into subject are contemplated according to the invention; the method is not dependent on any particular means of introduction and is not to be so construed. Means of introduction are well-known to those skilled in the art, and also are exemplified herein.

As used herein, the terms "effective amount", "effective dose", "sufficient amount", "amount effective to", "therapeutically effective amount" or grammatical equivalents thereof mean a dosage sufficient to produce a desired result, to ameliorate, or in some manner, reduce a symptom or stop or reverse progression of a condition and provide either a subjective relief of a symptom(s) or an objectively identifiable improvement as noted by a clinician or other qualified observer. Amelioration of a symptom of a particular condition by administration of a pharmaceutical composition described herein refers to any lessening, whether permanent or temporary, lasting, or transitory, that can be associated with the administration of the pharmaceutical composition.

As used herein, the term "prodrug" is intended to encompass compounds which, under physiologic conditions, are converted into the therapeutically active agents of the present invention. A common method for making a prodrug is to include one or more selected moieties which are hydrolyzed under physiologic conditions to reveal the desired molecule. In other embodiments, the prodrug is converted by an enzymatic activity of the host animal. For example, esters or carbonates (e.g., esters or carbonates of alcohols or carboxylic acids) are preferred prodrugs of the present invention. In certain embodiments, some or all of the compounds in a formulation represented above can be replaced with the corresponding suitable prodrug, e.g., wherein a hydroxyl in the parent compound is presented as an ester or a carbonate or carboxylic acid present in the parent compound is presented as an ester.

As used herein, the term "pharmaceutically acceptable" refers to compositions that are physiologically tolerable and do not typically produce an allergic or similar untoward reaction when administered to a subject, preferably a human subject. Preferably, as used herein, the term "pharmaceutically acceptable" means approved by a regulatory agency of a federal or state government or listed in the U.S. Pharmacopeia or other generally recognized pharmacopeia for use in animals, and more particularly in humans.

As used herein, the phrase "pharmaceutically acceptable carrier" means a pharmaceutically acceptable material, composition or vehicle, such as a liquid or solid filler, diluent, excipient, solvent or encapsulating material. Each carrier must be "acceptable" in the sense of being compatible with the other ingredients of the formulation and not injurious to the patient. Some examples of materials which can serve as pharmaceutically acceptable carriers include: (1) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations.

As used herein, a therapeutic that "prevents" a disorder or condition refers to a compound that, in a statistical sample, reduces the occurrence of the disorder or condition in the treated sample relative to an untreated control sample, or delays the onset or reduces the severity of one or more symptoms of the disorder or condition relative to the untreated control sample.

As used herein, a "subject" means a human or animal (in the case of an animal, more typically a mammal). In one aspect, the subject is a human.

As used herein, the term "treating" is art-recognized and includes administration to the host of one or more of the subject compositions, e.g., to diminish, ameliorate, or stabilize the existing unwanted condition or side effects thereof. All definitions, as defined and used herein, should be understood to control over dictionary definitions, definitions in documents incorporated by reference, and/or ordinary meanings of the defined terms.

EXAMPLES

Example 1: Synthesis of an Exemplary Small Molecule NNMT Inhibitor

A synthetic route to prepare compound 4 is illustrated in Scheme 1.

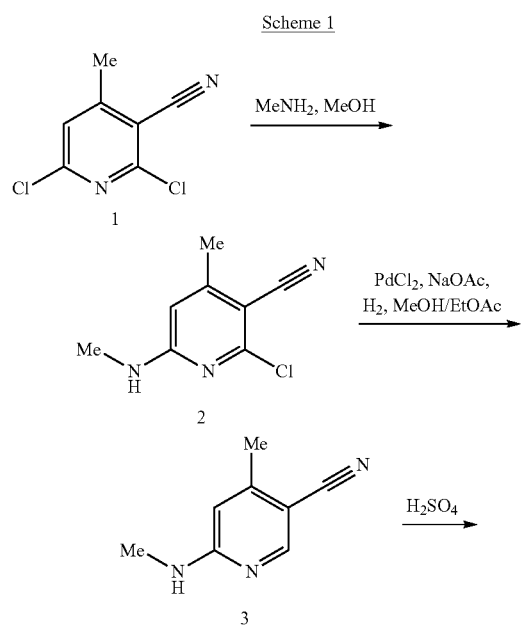

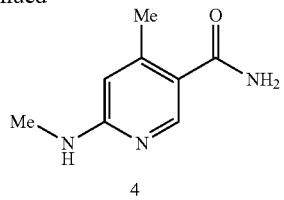

Briefly, commercially available 1 was treated with methylamine to afford a mixture of desired compound 2 alongside an undesired regioisomer. Automated column chromatography was sufficient to separate these two materials. 2 was then converted to 4 in a two-step reaction sequence in which the residual chlorine atom was removed by action of PdCl$_2$ under a hydrogen atmosphere to afford 3 followed by hydrolysis of the nitrile with concentrated sulfuric acid to yield 4.

2-chloro-4-methyl-6-(methylamino) nicotinonitrile (2)

To a solution of 2,6-dichloro-4-methylnicotinonitrile (1, 700 mg, 3.74 mmol) in MeOH (5.2 mL) at ambient temperature was added methylamine solution (33% in EtOH, 0.63 mL). The mixture was then warmed to 40° C. and stirred until LC/MS indicated reaction completion, approximately three hours. The resulting white precipitate was collected via vacuum filtration and washed with several small portions of water. The residue was further purified using automated column chromatography (0-40% EtOAc/Hex, 18 min run, 12 g column, 18 mL/min) to afford 2-chloro-4-methyl-6-(methylamino) nicotinonitrile (2, 170 mg, 0.94 mmol, 25% yield) as a white solid.

4-methyl-6-(methylamino) nicotinonitrile (3)

2-chloro-4-methyl-6-(methylamino) nicotinonitrile (2, 170 mg, 0.94 mmol) was suspended in a mixture of MeOH (3.4 mL) and EtOAc (0.75 mL). To the solution was then added NaOAc (149 mg, 1.8 mmol) followed by PdCl$_2$ (26.7 mg, 0.15 mmol). The reaction vessel was evacuated and refilled with hydrogen gas three times. The mixture was stirred at ambient temperature until LC/MS indicated reaction completion, approximately five hours. The reaction mixture was diluted with MeOH and filtered through a pad of celite. Upon concentration, 4-methyl-6-(methylamino) nicotinonitrile (3, 120 mg, 0.82 mmol, 87% yield) was obtained as a white solid.

4-methyl-6-(methylamino) nicotinamide (4)

4-methyl-6-(methylamino) nicotinonitrile (3, 17 mg, 0.12 mmol) was dissolved in conc. H$_2$SO$_4$ (0.5 mL) and stirred at 30° C. for sixteen hours. The reaction mixture was then cooled removed from heat, diluted with ice water, and adjusted to pH=3-4 via the addition of 6M NaOH (aq.). The resulting white precipitate was collected via vacuum filtration to afford 4-methyl-6-(methylamino) nicotinamide (4, 3.3 mg, 0.02 mmol, 17% yield).

Example 2—Evaluation of NNMT Inhibition

Figure 14:
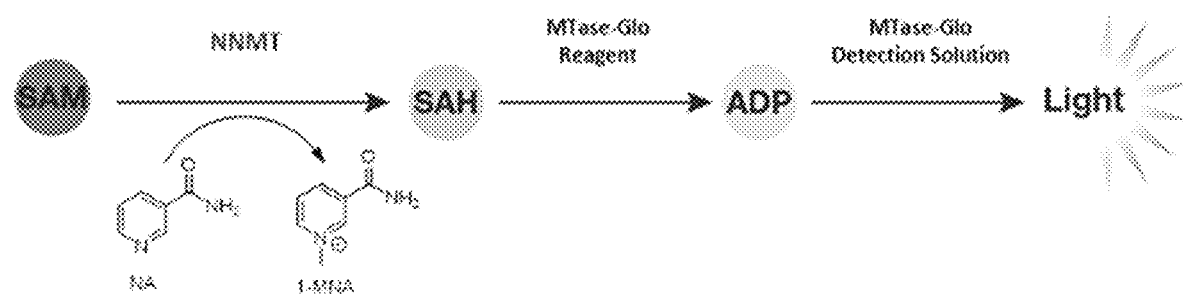
FIG. 14 is a scheme showing a visual summary of the Promega MTase-Glo Methyltransferase assay used to assess biochemical activity of novel inhibitors.

NNMT biochemical activity for was evaluated using the Promega Mtase-Glo Methyltransferase Assay kit. Assays were performed in a white, flat-bottomed 96 well plate. Each reaction well had a final volume of 20 μL and contained 40 nM recombinant human NNMT, 8 μM nicotinamide, and 6.7 UM SAM in 1× Reaction Buffer (20 mM Tris buffer pH 8.0, 0.50 mM NaCl, 1 mM EDTA, 3 mM $MgCl_2$, 0.1 mg/mL BSA, 1 mM DTT). Reactions were performed for 20 minutes at room temperature. MTase-Glo reagent and MTase-Glo detection solution were added according to manufacturer's instructions and luminescence signal measured with a SpectraMax i3 plate reader and data analyzed with Graph-Pad Prism version 8. FIG. 14 depicts a visual summary of the Promega MTase-Glo Methyltransferase assay used to assess biochemical activity of novel inhibitors.

Figure 2:
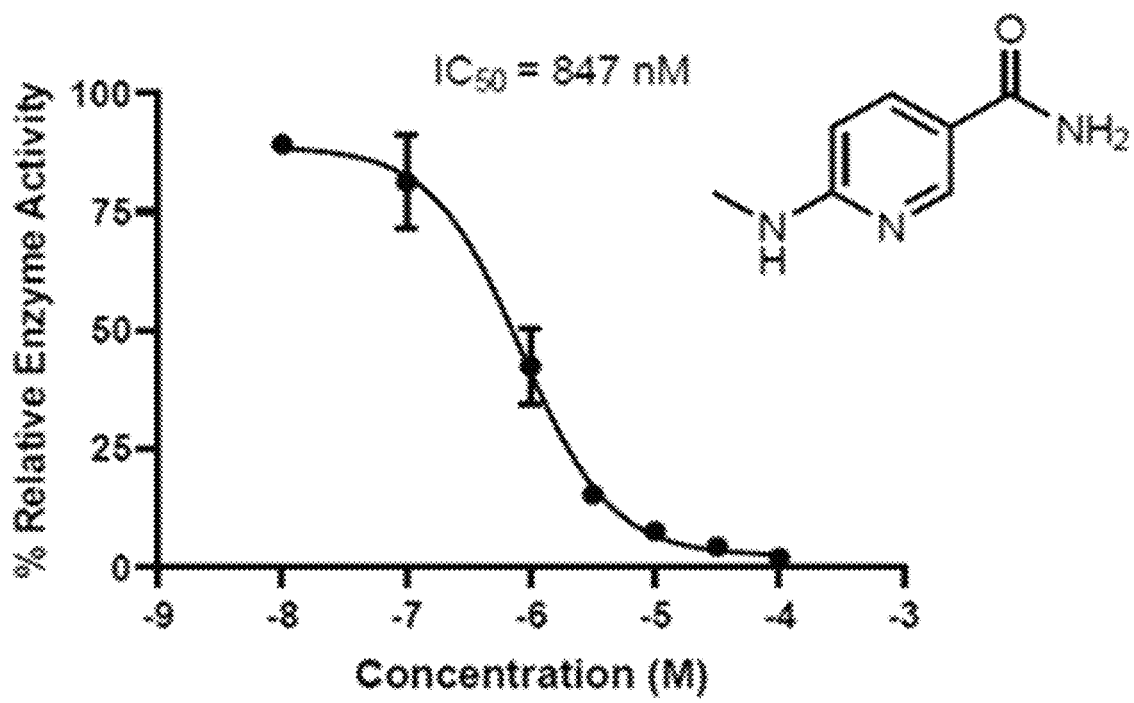
FIG. 2 is a plot showing data from an in vitro NNMT enzyme inhibition assay for JBSNF-000265 ($IC_{50}$=847 nM).

As depicted in FIGS. 1 and 2, Compound 4 has an $IC_{50}$=244 nM and JBSNF-000265 has an $IC_{50}$=847 nM in the in vitro NNMT enzyme inhibition assay.

Example 3—Evaluation of Cellular Inhibition of NNMT

Cellular activity was measured in K562 (ATCC) cells via measuring (1-methyl nicotinamide) 1-MNA levels after compound incubation at varying concentrations overnight. Cells were plated at 1 million per well and were incubated for 24 h with compounds at indicated concentrations. Cells were collected by pipetting and extracted with 200 ul acetonitrile containing internal deuterated standard 10 ng/ml d4-1-MNA. Samples were analyzed on an Agilent 64-60 Triple Quad LC/MS with Agilent 1290 Infinity HPLC using a Restek Allure 5 um PPFP column 150 mm×2.1. The mobile phase A was 2.5 mM ammonium formate in water, and mobile phase B was methanol with 0.1% formic acid, delivered at 0.25 mL/min. The capillary voltage was set to 2400V and the nozzle at 300V. The drying gas temperature was 240° C., the drying gas flow rate was 4 L/min, and the nebulizer pressure was 40 psi. The mass spectrometer was run in multiple reaction monitoring mode. Mass transitions were m/z 137.1 à 94.1 for 1-MNA and m/z 141.1 à 98.1 for $d_4$-MNA.

Figure 3:
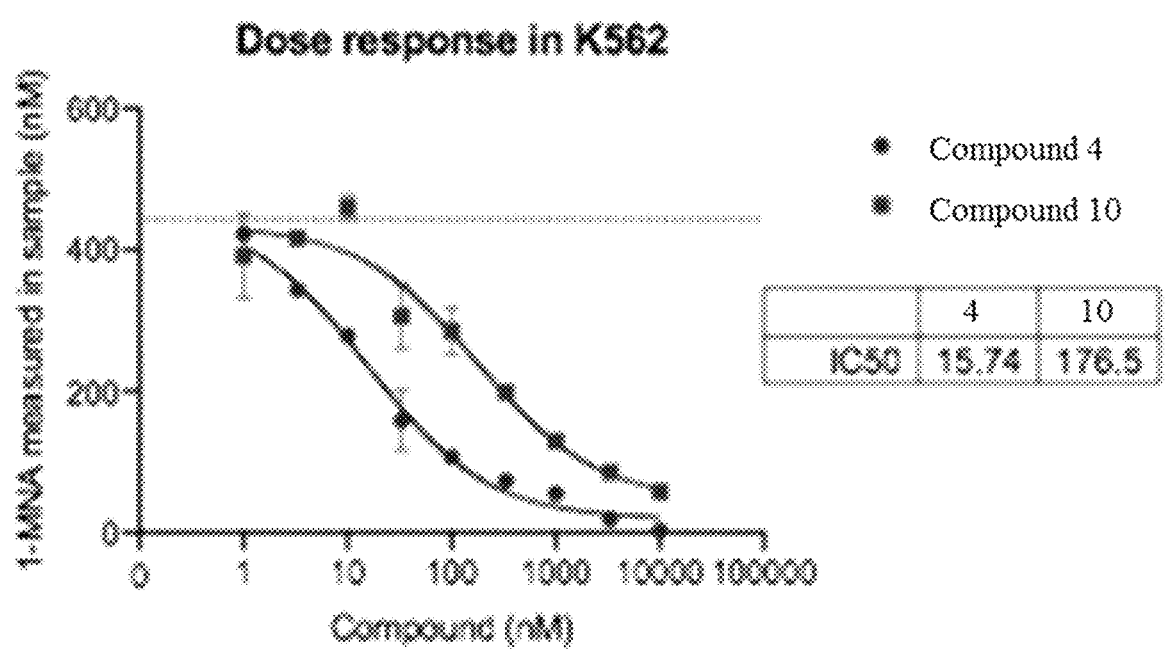
FIG. 3 is a plot showing data for cellular activity of Compound 4 and JBSNF-000265 (labeled compound 10) in K562 cells as measured by 1-MNA quantification.

In K562 cells, which express NNMT, Compound 4 inhibits NNMT with an $IC_{50}$=15 nM. In comparison, JBSNF-000265 $IC_{50}$=176 nM (FIG. 3). Compound 4 is 12-fold more potent than JBSNF-000265 in cells. However, Compound 4 was only 3.5-fold more potent than JBSNF-000265 in an in vitro biochemical assay.

Example 4—Comparison of hNNMT Inhibition with Other Nicotinamide Compounds

In vitro hNNMT inhibition and cell-based potency was determined for Compound 4 and various other nicotinamide compounds. The data is summarized in Tables 3 and 4. As shown in Table 3, the addition of a 4-Me on compound 4 affords an unexpected increase in potency compared to these other nicotinamide compounds.

TABLE 3

Inhibition comparison

| | JBSNF-000088 | JBSNF-000581 |
|---|---|---|
| in vitro hNNMT $IC_{50}$ | 2.4 μM | 0.84 μM |
| Cellular Activity $IC_{50}$, (cell type) | 1.6 μM (U2OS)<br>6.3 μM (3T3L-1) | N/A |

| | JBSNF-000265 (10) | 4 |
|---|---|---|
| in vitro hNNMT $IC_{50}$ | 0.85 μM | 0.24 μM |
| Cellular Activity $IC_{50}$, (cell type) | 0.3 μM (U2OS)<br>2.1 μM (3T3L-1)<br>0.17 μM (K562) | 0.016 μM (K562) |

TABLE 4

Inhibition comparison of Compounds 4 and 13

| Assay | Compound 4 | Compound 13 |
|---|---|---|
| In vitro hNNMT $IC_{50}$ | 0.24 μM | 0.673 μM |
| Cellular Activity $IC_{50}$ (K562) | 0.016 μM | 0.106 μM |

Example 5—Inhibition in Cancer-Associated Fibroblasts Obtained from Ovarian Cancer Patients All cells were cultured at 37° C. in a humidified incubator buffered with 5% $CO_2$. K562 cells were maintained in RPMI supplemented with 10% fetal bovine serum (FBS). Ovarian CAFs were maintained in MSC-Gro Vitroplus III for proliferation and in DMEM containing 10 μM methionine with 10% dialyzed FBS for experiments. K562 were purchased from ATCC. Ovarian CAFs were purchased from Neuromics.

1-MNA quantification in ovarian CAFs (Neuromics) was performed similarly as in K562 cells, except cells were scraped off the plate in PBS buffer after a six day continuous treatment with compound and then extracted.

Figure 4:
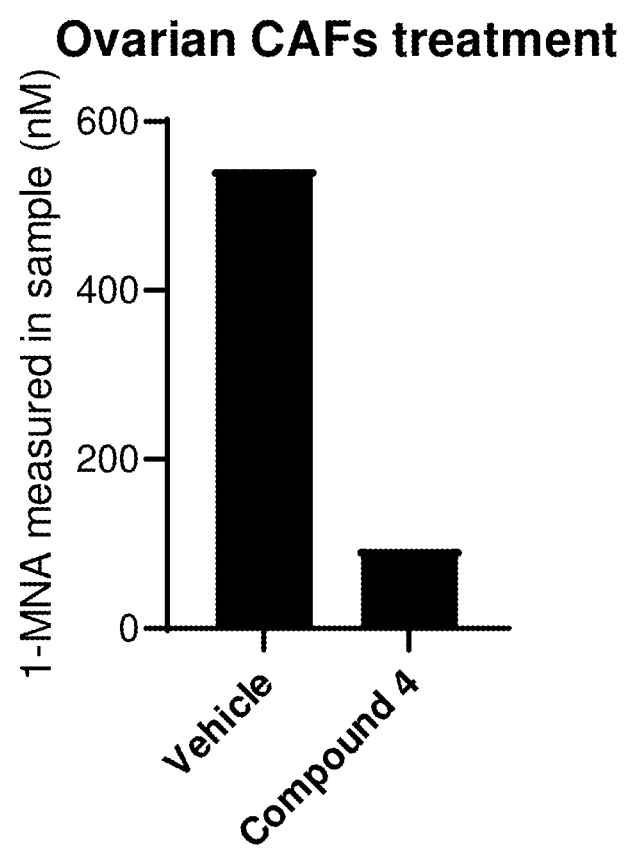
FIG. 4 is a bar graph showing data for 1-MNA quantification in ovarian cancer associated fibroblasts following treatment with Compound 4.
Figure 5:
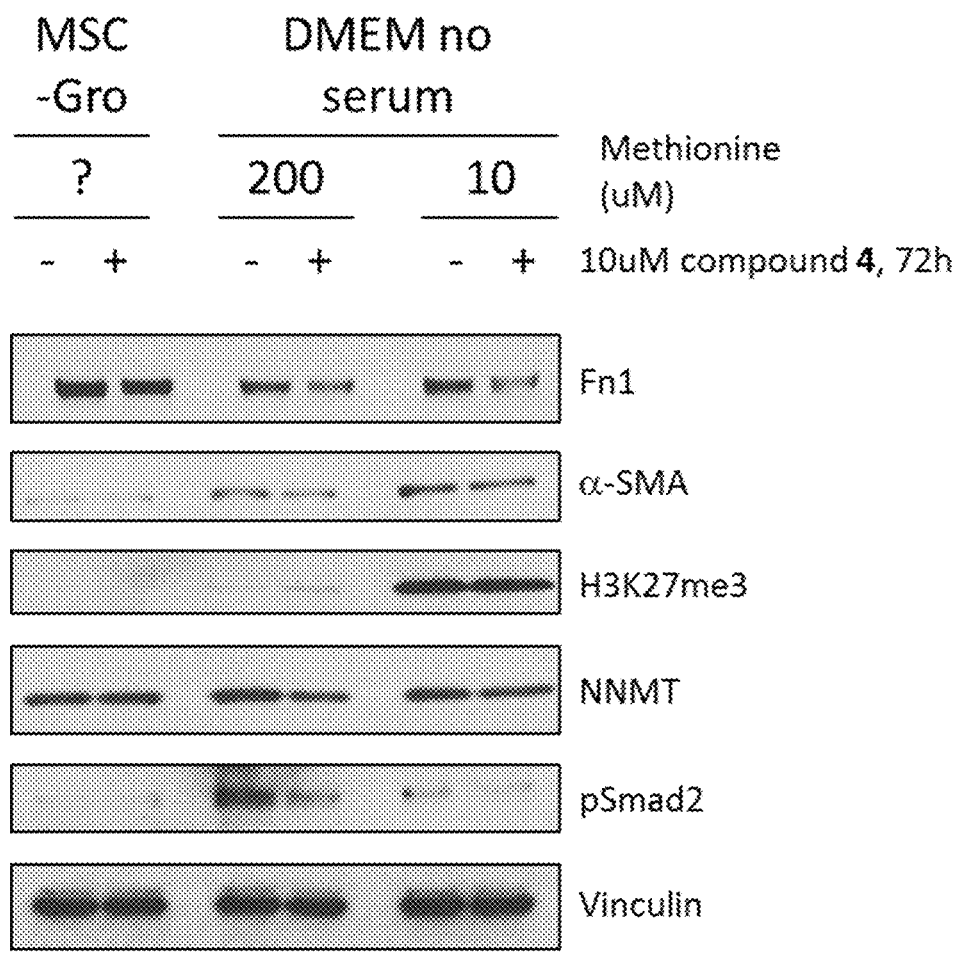
FIG. 5 is a gel electrophoresis image of Ovarian Cancer Associated Fibroblasts (CAF) markers after incubation with Compound 4.
Figure 6:
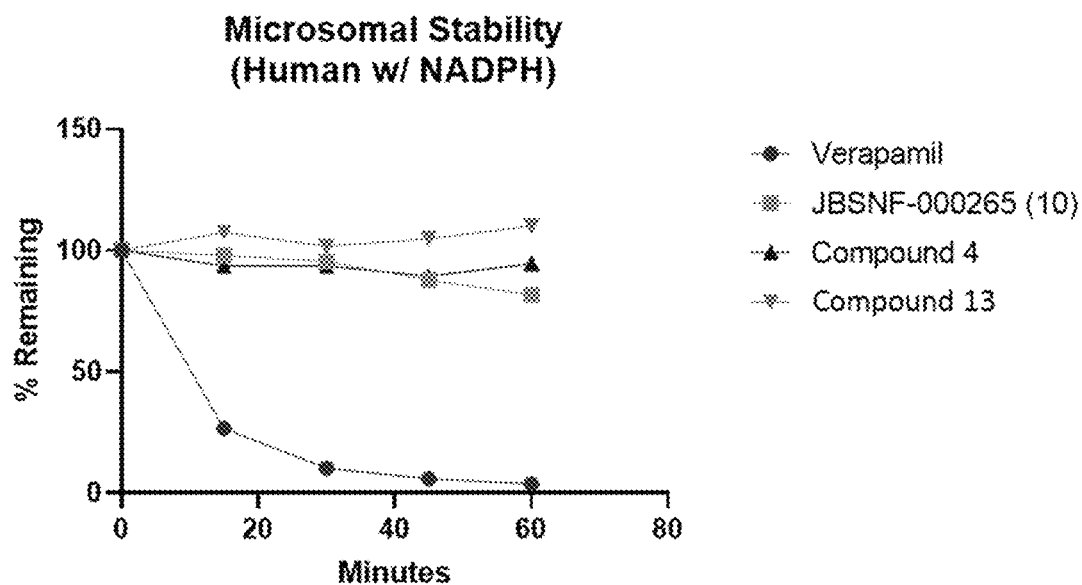
FIG. 6 is a plot showing data for the percent of Verapamil, JBSNF-00265 (10), Compound 4, and Compound 13 remaining over time in human microsomes with NADPH.
Figure 7:
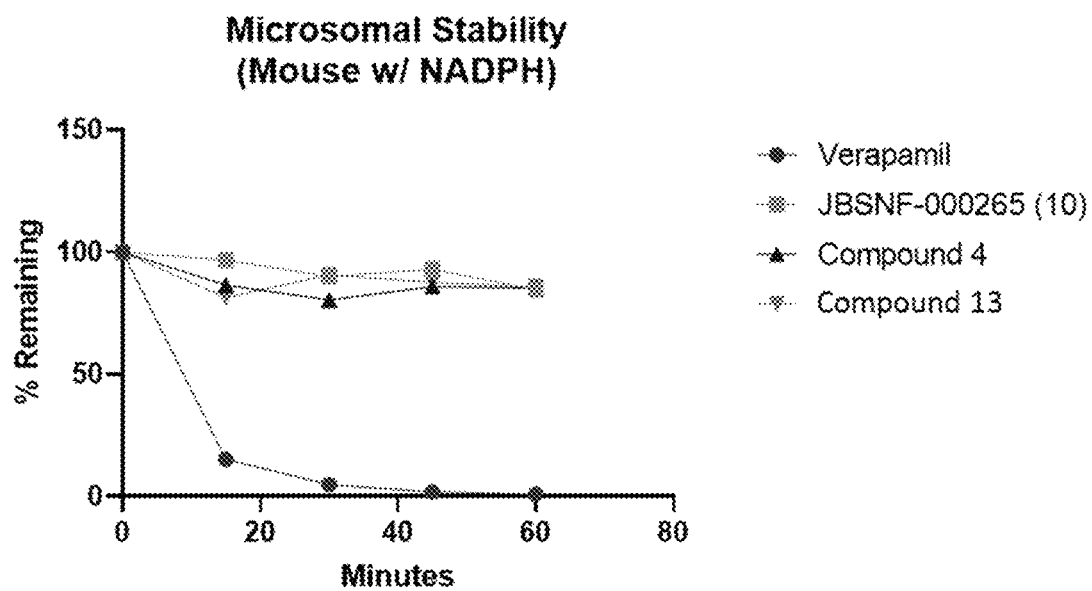
FIG. 7 is a plot showing data for the percent of Verapamil, JBSNF-00265 (10), Compound 4, and Compound 13 remaining over time in mouse microsomes with NADPH.
Figure 8:
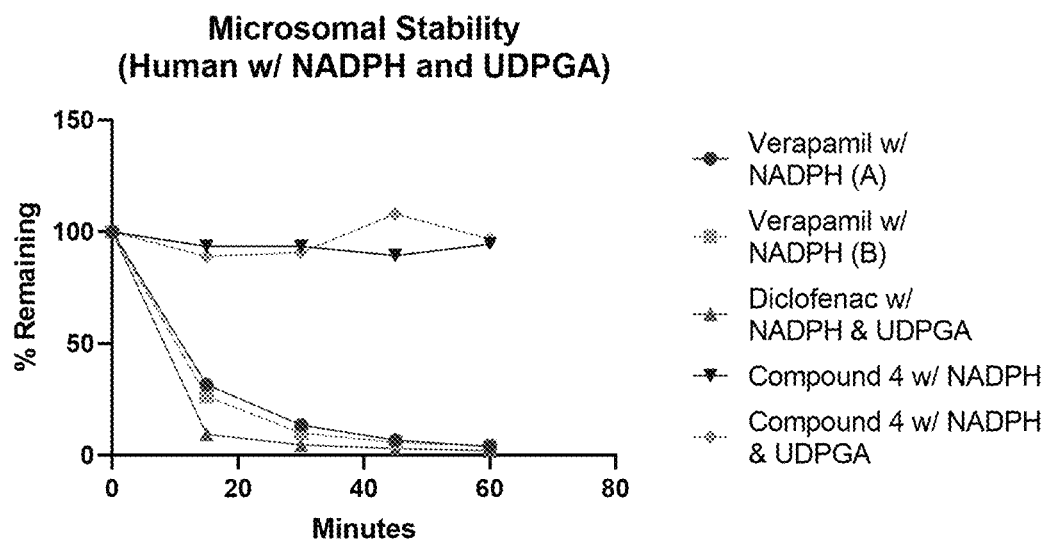
FIG. 8 is a plot showing data for the percent of Verapamil, Diclofenac, and Compound 4, remaining over time in human microsomes with NADPH and UDPGA.
Figure 9:
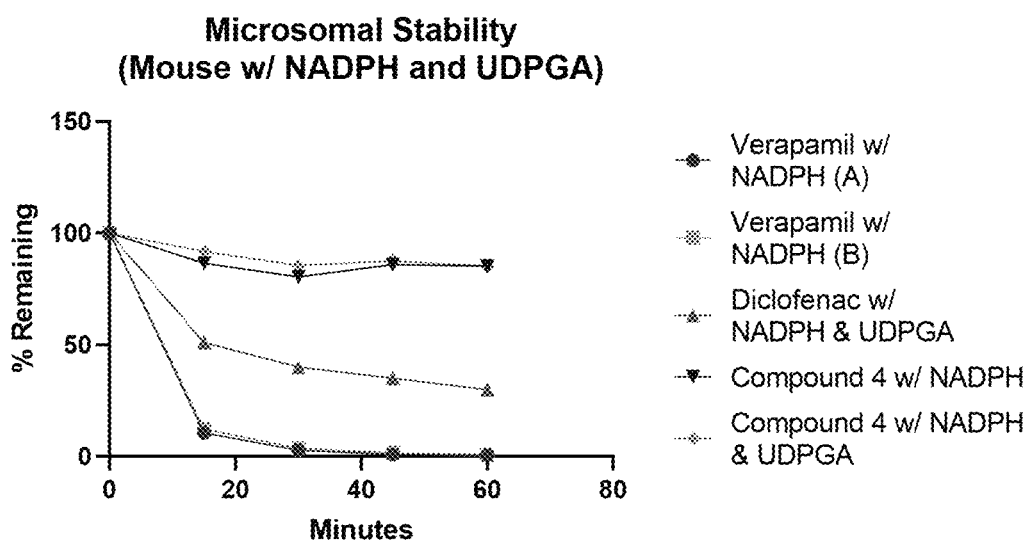
FIG. 9 is a plot showing data for the percent of Verapamil, Diclofenac, and Compound 4, remaining over time in mouse microsomes with NADPH and UDPGA.

Cancer-associated fibroblasts derived from ovarian cancer patients were treated with Compound 4. As shown in FIG. 4, Compound 4 (1 μM) significantly inhibited NNMT in these cells. Additionally, a reduction in CAF markers was shown in ovarian CAFs when treated with Compound 4 (FIG. 5).

Example 6—Microsomal Stability Studies

The metabolism of Compounds 4 and 13 was evaluated using a microsomal stability assay. Briefly, a master solution was prepared according to Tables 5 and 6.

TABLE 5

Preparation of Master Solution (for Phase I)

| Reagent | Stock Concentration | Volume | Final Concentration |
|---|---|---|---|
| Phosphate buffer | 200 mM | 200 μL | 100 mM |
| Ultra-pure $H_2O$ | — | 106 μL | — |
| $MgCl_2$ solution | 50 mM | 40 μL | 5 mM |
| Microsomes | 20 mg/mL | 10 μL | 0.5 mg/mL |

TABLE 6

Preparation of Master Solution (for Phase II)

| Reagent | Stock Concentration | Volume | Final Concentration |
|---|---|---|---|
| Phosphate buffer | 200 mM | 200 μL | 100 mM |
| Ultra-pure $H_2O$ | — | 66 μL | — |
| $MgCl_2$ solution | 50 mM | 40 μL | 5 mM |
| Alamethacin | 5 mg/mL | 2 μL | 25 μg/mL |
| Microsomes | 20 mg/mL | 10 μL | 0.5 mg/mL |

For the assay with NADPH (Phase I), 40 μL of 10 mM NADPH solution was added to each well. The final concentrations of NADPH was 1 mM. The mixture was pre-warmed at 37° C. for 5 minutes. The negative control samples were prepared by replacing NADPH solutions with 40 μL of ultra-pure H2O. The negative control was used to exclude the misleading factor that resulted from instability of chemical itself. Samples with NADPH were prepared in duplicate. Negative controls were prepared in singlet.

The reaction was started with the addition of 4 μL of 200 μM control compound or test compound solutions. Verapamil was used as positive control in this study. The final concentration of test compound or control compound was 2 μM.

For the assay with NADPH and UDPGA (Phase II), 40 μL of 10 mM NADPH solution and 40 μL of 20 mM UDPGA solution were added to each well. The final concentrations of NADPH and UDPGA were 1 mM and 2 mM. The mixture was pre-warmed at 37° C. for 5 minutes. The negative control samples were prepared by replacing cofactors (NADPH and UDPGA) solution with 80 μL of ultra-pure H2O. Samples with cofactors were prepared in duplicate. Negative controls were prepared in singlet.

The reaction was started with the addition of 2 μL of 400 μM control compound or test compound solutions. Diclofenac was used as positive control in this study. The final concentration of test compound or control compound was 2 μM.

Aliquots of 50 μL were taken from the reaction solution at 0, 15, 30, 45 and 60 minutes. The reaction was stopped by the addition of 4 volumes of cold acetonitrile with IS (100 nM alprazolam, 200 nM imipramine, 200 nM labetalol and 2 μM ketoprofen). Samples were centrifuged at 3,220 g for 40 minutes. Aliquot of 90 μL of the supernatant was mixed with 90 μL of ultra-pure $H_2O$ and then used for LC-MS/MS analysis.

The results of the assays are shown in FIGS. 6-9 and Tables 7 and 8.

TABLE 7

Summary of Microsomal Stability for Compound 4

| Parameter | Assay Format | Compound 4 (h/m) | JBSNF-000265 (h/m) |
|---|---|---|---|
| $T_{1/2}$ (min) | NADPH | >255.85/>255.85 | ~202.75/~280.29 |
| | NADPH & UDPGA | >255.85/>255.85 | — |
| $CL_{int}$ (μL/min/mg protein) | NADPH | <5.42/<5.42 | ~6.84/~4.94 |
| | NADPH & UDPGA | <5.42/<5.42 | — |
| Scaled-up $CL_{int}$ (mL/min/Kg) | NADPH | <6.79/<23.70 | ~8.57/~21.63 |
| | NADPH & UDPGA | <6.79/<23.70 | — |
| Predicted hepatic $Cl_{int}$ (mL/min/kg) | NADPH | <5.12/<18.76 | ~6.06/~17.44 |
| | NADPH & UDPGA | <5.12/<18.76 | — |
| Remaining (%) at 60 min | NADPH | 94.54/85.32 | 81.72/84.73 |
| | NADPH & UDPGA | 96.85/85.18 | — |

If remaining percentage at 60 minutes is greater than 85%, the t½ and CLint is reported as ">255.85" and "<5.42", respectively. If remaining (%) at 60 minutes is between 50% and 85%, the t½ and CLint is reported with "~". Values from human liver microsomes are given first followed by mouse "(h/m)".

TABLE 8

Summary of Compound 13 Microsomal Stability

| Parameter | Compound 13 (h/m) | JBSNF-000265 (h/m) |
|---|---|---|
| $T_{1/2}$ (min) | >255.85/>255.85 | ~202.75/~280.29 |
| $CL_{int}$ (μL/min/mg protein) | <5.42/<5.42 | ~6.84/~4.94 |
| Scaled-up $CL_{int}$ (mL/min/Kg) | <6.79/<23.70 | ~8.57/~21.63 |
| Predicted hepatic $Cl_{int}$ (mL/min/kg) | <5.12/<18.76 | ~6.06/~17.44 |
| Remaining (%) at 60 min | 110.09/85.85 | 81.72/84.73 |

If remaining percentage at 60 minutes is greater than 85%, the t½ and CLint will be reported as ">255.85" and "<5.42", respectively. If remaining (%) at 60 minutes is between 50% and 85%, the t½ and CLint will be reported with "~". Values from human liver microsomes are given first followed by mouse "(h/m)".

Example 7—In Vivo Pharmacokinetic and Pharmacodynamics Studies

The pharmacokinetic profile of Compound 4 and was evaluated following its intravenous (IV) and oral (PO) administration to female C57B16/N mice at 1 mg/kg IV and 10 and 50 mg/kg PO. JBSNF-000265 was evaluated at 50 mg/kg PO only. 1-Methylnicotinamide (1-MNA) concentrations were also determined.

Doses were freshly prepared on the day of dosing. Vehicle compositions of each dose are listed below. For IV, an appropriate amount of the test article was dissolved in the vehicle with vortexing and/or sonication to achieve a solution with the intended concentration level. For PO, an appropriate amount of the test article was dissolved in the appropriate vehicle; vortex and/or sonication can be used to achieve a solution formulation with the intended concentration level.

IV (Compound 4): 0.5% Tween 80 in saline.
PO (Compound 4): 0.2% Tween 80/10% PEG-300 in water. Adjust pH with 1N hydrochloric acid to obtain a clear solution
PO (JBSNF-000265): 0.2% Tween 80/10% PEG-300 in water The study group and the dosing information are shown in Table 9.

TABLE 9

Dosing and Route of Administration

| Treatment | Dose Level (mg/kg) | Dose Volume (mL/kg) | Conc. (mg/kg) | Administration Route | No. of Animals |
|---|---|---|---|---|---|
| Compound 4 | 5 | 5 | 0.2 | IV | 3 Female |
| Compound 4 | 10 | 10 | 1 | PO | 3 Female |
| Compound 4 | 50 | 10 | 5 | PO | 3 Female |
| JBSNF-000265 | 50 | 10 | 5 | PO | 3 Female |

After dosing, 0.03 mL blood samples were collected from the dorsal metatarsal vein (0.2 mL at final time point via heart puncture) at the following time points:
IV: pre-dose, 0.0833, 0.25, 0.5, 1, 2, 4, 6, 8, 24 hours post dose
PO: pre-dose, 0.25, 0.5, 1, 2, 4, 6, 8, 24 hours post dose Blood from each sample was transferred into plastic micro centrifuge tubes with $EDTAK_2$ as an anticoagulant. The blood samples were centrifuged at 4,000 g for 5 minutes at 4° C. to obtain plasma. Samples were immediately frozen in the upright position and stored at −75±15° C. prior to analysis.

Concentrations of Compound 4 and JBSNF-000265 in the plasma samples were determined using the LC-MS/MS methods described below.

Samples were analyzed on a AB Sciex Triple Quad 5500 LC/MS/MS instrument using a Gemini 5 μm C18 110 A 150×3 mm column (XBridge BEH C18 2.5 μm 4.6×75 mm in the case of JBSNF-000265) with the following equipment installed. Prominence Degasser DGU-20A5R(C), Serial NO. L20705414138 IX; Liquid Chromatograph LC-30AD, Serial NO. L20555408197 AE and L20555408195 AE; Communications Bus Module CBM-20A, Serial NO. L20235429486 CD; Auto Sampler SIL-30AC, Serial NO. L20565403814 AE; Rack changer II: L20585400900 SS The mobile phase A was 0.1% formic acid in water, and the mobile phase B was 95% acetonitrile in water (0.1% formic acid), delivered at 0.4 mL/min.

Sample Preparation: Compound 4 and JBSNF-000265

The desired serial concentrations of working solutions were achieved by diluting stock solution of analyte with 50% acetonitrile in water solution. 5 μL of working solutions (1, 2, 3, 5, 10, 50, 100, 500, 1000 ng/mL) were added to 5 μL of the blank C57B16/N mouse plasma to achieve calibration standards of 1~1000 ng/ml (1, 2, 3, 5, 10, 50, 100, 500, 1000 ng/mL) in a total volume of 10 μL. Four quality control samples at 3 ng/ml, 5 ng/ml, 100 ng/mL, and 800 ng/mL for plasma were prepared independently of those used for the calibration curves. These QC samples were prepared on the day of analysis in the same way as calibration standards.

10 μL of standards, 10 μL of QC samples and 10 μL of unknown samples (5 μL of plasma with 5 μL of blank solution) were added to 100 μL of acetonitrile (containing D4-1-MNA 50 ng/mL) for precipitating protein respectively. Then the samples were vortexed for 30 s. After centrifugation at 4 degree Celsius, 4,000 rpm for 15 min, the supernatant was diluted 3 times with water. 10 μL of diluted supernatant (20 μL in the case of JBSNF-000265) was injected into the LC/MS/MS system for quantitative analysis.

Sample Preparation: 1-Methylnicotinamide (1-MNA)

The desired serial concentrations of working solutions were achieved by diluting stock solution of analyte with 50% acetonitrile in water solution. 5 μL of working solutions (1, 2, 3, 5, 10, 50, 100, 500, 1000 ng/mL) were added to 5 μL of water to achieve calibration standards of 1~1000 ng/mL (1, 2, 3, 5, 10, 50, 100, 500, 1000 ng/mL) in a total volume of 10 μL. Four quality control samples at 3 ng/ml, 5 ng/mL, 100 ng/mL, and 800 ng/mL for water were prepared independently of those used for the calibration curves. These QC samples were prepared on the day of analysis in the same way as calibration standards.

10 μL of standards, 10 μL of QC samples and 10 μL of unknown samples (5 μL of plasma with 5 μL of blank solution) were added to 100 μL of acetonitrile (containing D4-1-MNA 100 ng/mL) for precipitating protein respectively. Then the samples were vortexed for 30 s. After centrifugation at 4 degree Celsius, 4000 rpm for 15 min, the supernatant was diluted 3 times with water. 5 μL of diluted supernatant was injected into the LC/MS/MS system for quantitative analysis.

Recovery

5 μL of working solutions (10, 100, 800 ng/ml) were added to 5 μL of the blank C57B16/N Mouse plasma to achieve three samples at 10 ng/ml, 100 ng/mL, and 800 ng/ml, 30 μL of samples were added to 100 μL of acetonitrile containing IS mixture for precipitating protein respectively. Then the samples were vortexed for 30 s. After centrifugation at 4 degree Celsius, 4000 rpm for 15 min, the supernatant was diluted 3 times with water. 5 L of diluted supernatant was injected into the LC/MS/MS system for quantitative analysis.

Results

Figure 10:
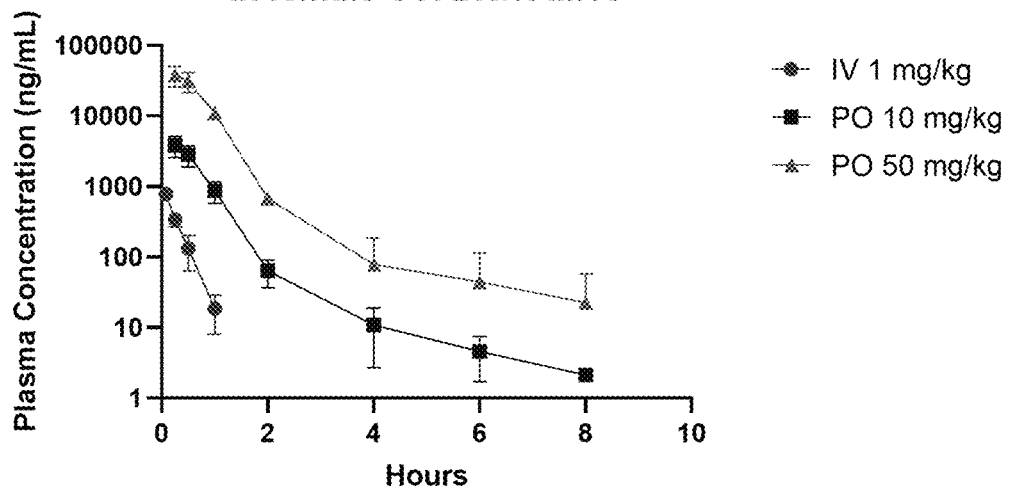
FIG. 10 is a plot showing data for the mean plasma concentration of compound 4 vs. time in female C57Bl6/N mice after dosing with Compound 4 intravenously at 1 mg/kg and orally at 10 mg/kg and 50 mg/kg.
Figure 11:
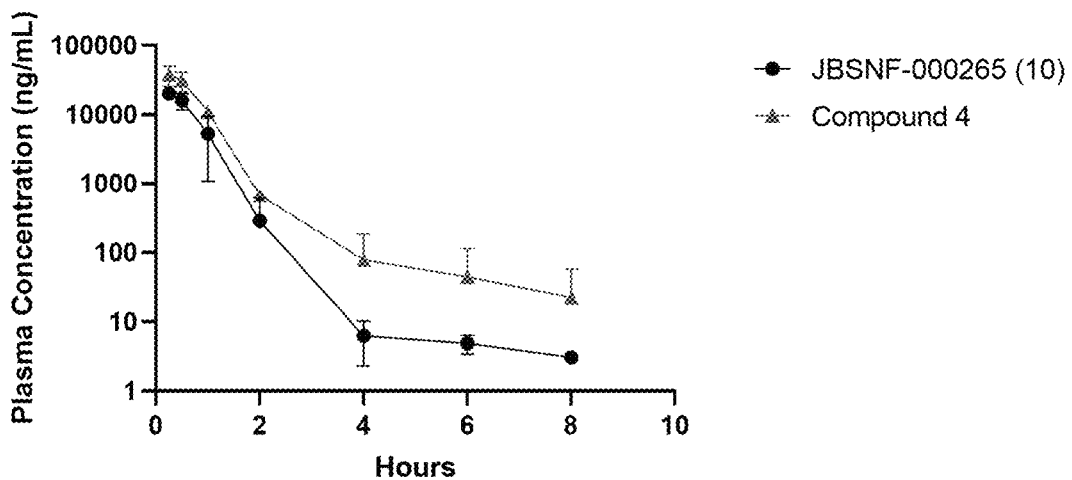
FIG. 11 is a plot showing data for the mean plasma concentration of compound 4 and JBSNF-00265 (10) vs. time in female C57Bl6/N mice after oral administration of 50 mg/kg of inhibitor.
Figure 12:
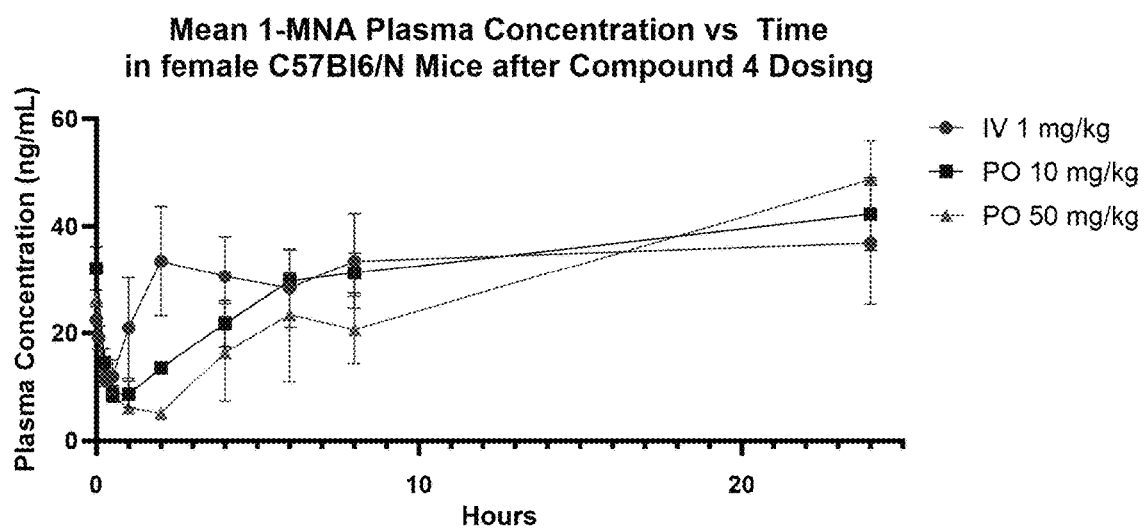
FIG. 12 is a plot showing data for the mean plasma concentration of 1-MNA vs. time in female C57Bl6/N mice after dosing with Compound 4 intravenously at 1 mg/kg and orally at 10 mg/kg and 50 mg/kg.
Figure 13:
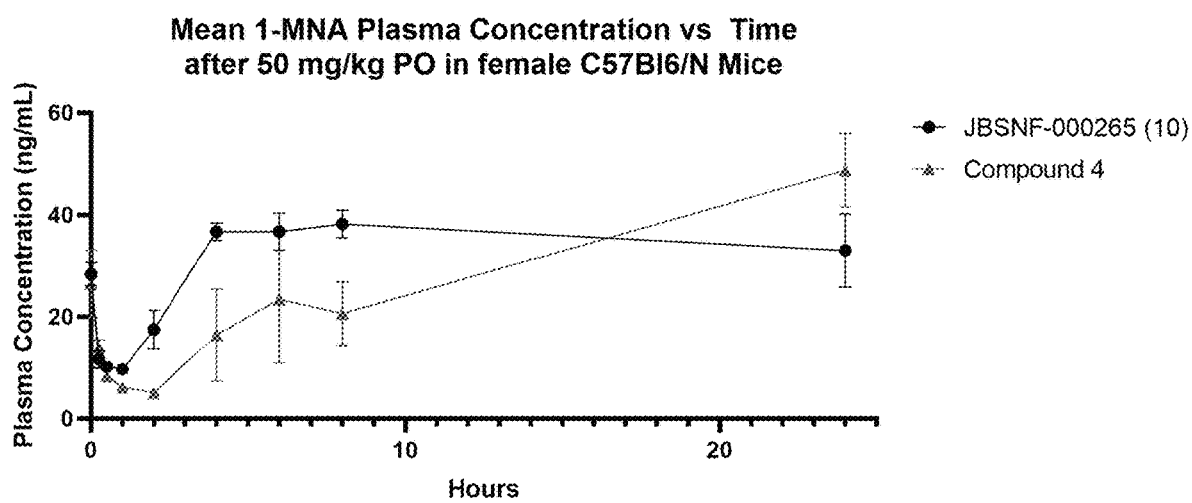
FIG. 13 is a plot showing data for the mean plasma concentration of 1-MNA vs. time in female C57Bl6/N mice after oral administration of 50 mg/kg of compound 4 or JBSNF-00265 (10).

The mean plasma concentration results for Compound 4 and JBSNF-000265 are shown in FIGS. 10 and 11 and for 1-MNA are shown in in FIGS. 12 and 13.

The Mean PK Parameters of Compound 4 and JBSNF-000265 (10) in female C57B16/N after different dosages of inhibitor are summarized in Table 10.

TABLE 10

Mean PK Parameters

| PK Parameter | Compound 4 | | | JBSNF-000265 (10) |
| --- | --- | --- | --- | --- |
|  | IV 1 mg/kg | PO 10 mg/kg | PO 50 mg/kg | PO 50 mg/kg |
| $T_{1/2}$ (h) | 0.174 | 1.11 | 1.79 | 1.06 |
| $T_{max}$ (h) | — | 0.333 | 0.333 | 0.333 |
| $C_{max}$ (ng/mL) | — | 4000 | 38900 | 20867 |
| $AUC_{last}$ (h * ng/ml) | 273 | 2801 | 30747 | 15447 |
| $AUC_{Inf}$ (h * ng/ml) | 278 | 2806 | 30822 | 15452 |
| $AUC\_\%Extrap\_obs$ (%) | 1.63 | 0.194 | 0.319 | 0.0313 |
| $MRT_{Inf}\_obs$ (h) | 0.216 | 0.635 | 0.695 | 0.570 |
| $AUC_{last}/D$ (h * mg/mL) | 273 | 280 | 615 | 309 |
| F_last (%) | — | 101 | 222 | NA |

The Mean PK Parameters of Compound 4 in female C57B16/N After IV 1 mg/kg dosage are summarized in Table 11.

TABLE 11

Mean PK Parameters

| PK Parameter | Compound 4 |
| --- | --- |
| Cl_obs (mL/min/kg) | 62.8 |
| $T_{1/2}$ (h) | 0.174 |
| $C_0$ (ng/mL) | 1192 |
| $AUC_{last}$ (h * ng/mL) | 273 |
| $AUC_{Inf}$ (h * ng/ml) | 278 |
| $AUC\_\%Extrap\_obs$ (%) | 1.63 |
| $MRT_{Inf}\_obs$ (h) | 0.216 |
| $AUC_{last}/D$ (h * mg/mL) | 273 |
| $V_{ss}\_obs$ (L/kg) | 0.786 |

The Mean PK Parameters of 1-MNA in Female C57B16/N After Different Dosages of Inhibitor are summarized in Table 12.

TABLE 12

Mean PK Parameters

| PK Parameter | Compound 4 | | | JBSNF-000265 (10) |
| --- | --- | --- | --- | --- |
|  | IV 1 mg/kg | PO 10 mg/kg | PO 50 mg/kg | PO 50 mg/kg |
| $T_{max}$ (h) | 16.7 | 18.7 | 24.0 | 6.7 |
| $C_{max}$ (ng/mL) | 39.3 | 42.4 | 48.8 | 39.3 |
| $AUC_{last}$ (h * ng/ml) | 792 | 761 | 678 | 799 |

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

We claim:

1. A compound having the structure of Formula I or a pharmaceutically acceptable salt or prodrug thereof:

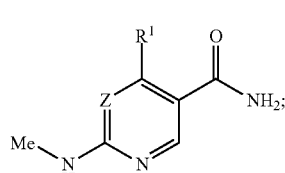

wherein
R$^1$ is halo, cyano, optionally substituted alkyl, cycloalkyl, or alkynyl; and
Z is CH.

2. The compound of claim 1, wherein R$^1$ is optionally substituted alkyl.

3. The compound of claim 2, wherein R$^1$ is optionally substituted lower alkyl.

4. The compound of claim 3, wherein R$^1$ is substituted methyl.

5. The compound of claim 3, wherein R$^1$ is substituted with halo.

6. The compound of claim 5, wherein R$^1$ is substituted with fluoro.

7. The compound of claim 1, wherein R$^1$ is CF$_3$ or CHF$_2$.

8. The compound of claim 1, wherein R$^1$ is alkynyl.

9. The compound of claim 8, wherein R$^1$ is ethynyl.

10. The compound of claim 1, wherein R$^1$ is cyano.

11. The compound of claim 1, wherein R$^1$ is cycloalkyl.

12. The compound of claim 1, wherein R$^1$ is cyclopropyl.

13. A compound, or a pharmaceutically acceptable salt thereof, selected from the group consisting of:

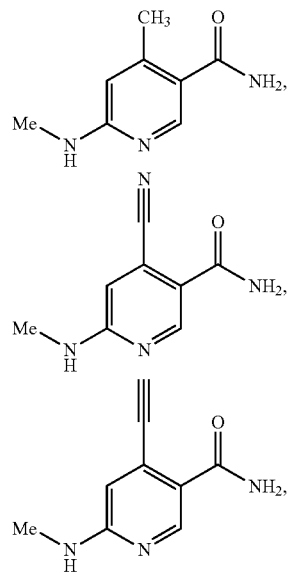

-continued

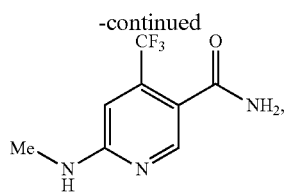

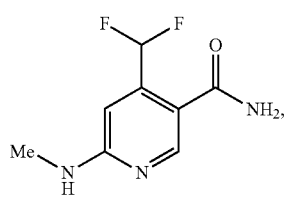

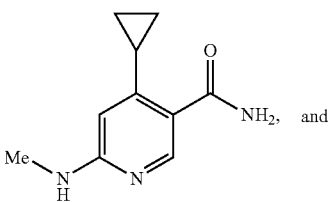 and

-continued

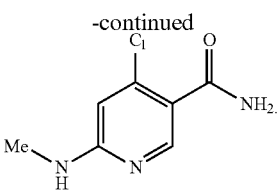

14. A pharmaceutical composition, comprising a compound of claim 1; and a pharmaceutically acceptable excipient or carrier.

15. A method of treating or preventing a cancer, comprising administering to a subject in need thereof an effective amount of a compound of claim 1, thereby treating or preventing the cancer.

16. The method of claim 15, further comprising conjointly administering to the subject an effective amount of one or more additional chemotherapeutic agents.

17. A method of inhibiting tumor growth, comprising administering to a subject in need thereof an effective amount of a compound of claim 1.

18. A pharmaceutical composition, comprising a compound of claim 13; and a pharmaceutically acceptable excipient or carrier.

19. A method of treating or preventing a cancer, comprising administering to a subject in need thereof an effective amount of a compound of claim 13, thereby treating or preventing the cancer.

\* \* \* \* \*